(12) United States Patent
Sauvageau et al.

(10) Patent No.: US 11,485,433 B2
(45) Date of Patent: Nov. 1, 2022

(54) VEHICLE AND TRACK SYSTEM WITH PRESSURE-ADJUSTABLE WHEELS

(71) Applicant: SOUCY INTERNATIONAL INC., Drummondville (CA)

(72) Inventors: Yves Sauvageau, Drummondville (CA); Pierre-Yves Pepin, Drummondville (CA); Marc Nadeau, Drummondville (CA); Branislav Nanac, Drummondville (CA); Genevieve Therrien, Drummondville (CA); Andre Todd, Mont St-Hilaire (CA); Cedric Alliguie, Saint-Hyacinthe (CA); Jonathan Lapalme, Drummondville (CA); Nicolas Dubuc, Drummondville (CA); Philippe Jaillet-Gosselin, Drummondville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 494 days.

(21) Appl. No.: 16/562,903

(22) Filed: Sep. 6, 2019

(65) Prior Publication Data

US 2020/0079443 A1 Mar. 12, 2020

Related U.S. Application Data

(60) Provisional application No. 62/728,690, filed on Sep. 7, 2018, provisional application No. 62/728,673, filed
(Continued)

(51) Int. Cl.
*B62D 55/065* (2006.01)
*B62D 55/14* (2006.01)
(Continued)

(52) U.S. Cl.
CPC .......... *B62D 55/065* (2013.01); *B60C 23/005* (2013.01); *B60C 23/10* (2013.01);
(Continued)

(58) Field of Classification Search
CPC .. B62D 55/065; B62D 55/084; B62D 55/104; B62D 55/112; B62D 55/116;
(Continued)

(56) References Cited

U.S. PATENT DOCUMENTS 4,298,047 A * 11/1981 Bobard ................ B62D 49/085
141/38
4,603,916 A 8/1986 Granryd
(Continued)

FOREIGN PATENT DOCUMENTS

EP 1202867 B1 9/2004
EP 2727803 A2 5/2014
(Continued)

OTHER PUBLICATIONS

Supplementary European Search Report for EP 19853721 dated Jul. 30, 2022; Szaip, Andras.
(Continued)

*Primary Examiner* — Anne Marie M Boehler
(74) *Attorney, Agent, or Firm* — BCF LLP

(57) ABSTRACT

A vehicle includes a plurality of track systems, a fluid pump, a plurality of fluid lines fluidly connecting the fluid pump to at least some of the tires of the wheels of each of the track systems, a plurality of pneumatic inflation actuators, a plurality of pneumatic deflation actuators, and a system controller. The system controller is in electronic communication with the fluid pump, the plurality of pneumatic inflation actuators, and the plurality of pneumatic deflation actuators. The system controller is operable to selectively adjust fluid pressure in select ones of the wheels of any one
(Continued)

of the track systems of the vehicle by actuating corresponding ones of the plurality of pneumatic inflation actuators and the plurality of pneumatic deflation actuators. A track system has at least one of the leading idler wheels, trailing idler wheels, and mid-roller wheels including a tire containing a fluid.

18 Claims, 8 Drawing Sheets

Related U.S. Application Data on Sep. 7, 2018, provisional application No. 62/728,662, filed on Sep. 7, 2018, provisional application No. 62/728,161, filed on Sep. 7, 2018, provisional application No. 62/728,697, filed on Sep. 7, 2018, provisional application No. 62/728,669, filed on Sep. 7, 2018.

(51) Int. Cl.

| | |
|---|---|
| B62D 55/084 | (2006.01) |
| B60C 23/16 | (2006.01) |
| B60C 23/00 | (2006.01) |
| B60C 23/10 | (2006.01) |
| G01M 17/03 | (2006.01) |
| B62D 55/30 | (2006.01) |
| B62D 55/15 | (2006.01) |
| B62D 55/24 | (2006.01) |
| B62D 11/00 | (2006.01) |
| B62D 11/20 | (2006.01) |
| G01L 5/1627 | (2020.01) |
| B62D 55/10 | (2006.01) |
| B62D 55/12 | (2006.01) |

(52) U.S. Cl.
CPC ............ *B60C 23/16* (2013.01); *B62D 11/003* (2013.01); *B62D 11/20* (2013.01); *B62D 55/084* (2013.01); *B62D 55/10* (2013.01); *B62D 55/12* (2013.01); *B62D 55/14* (2013.01); *B62D 55/15* (2013.01); *B62D 55/24* (2013.01); *B62D 55/244* (2013.01); *B62D 55/305* (2013.01); *G01L 5/1627* (2020.01); *G01M 17/03* (2013.01); *B60C 2200/08* (2013.01)

(58) Field of Classification Search
CPC ...... B62D 55/14; B62D 55/18; B62D 55/247; B62D 55/30; B60C 23/00; B60C 23/002; B60C 23/005; B60C 23/10; B60C 23/26; G01L 5/1627; G01M 17/03
See application file for complete search history.

(56) References Cited

U.S. PATENT DOCUMENTS

| | | | | |
|---|---|---|---|---|
| 4,763,709 | A * | 8/1988 | Scholer | B60C 23/001 702/140 |
| 4,765,383 | A * | 8/1988 | Bott | B60C 23/002 152/416 |
| 4,782,878 | A * | 11/1988 | Mittal | B60C 23/00354 141/38 |
| 4,917,162 | A | 4/1990 | De Longcamp | |
| 6,158,539 | A | 12/2000 | Isley | |
| 6,408,965 | B1 * | 6/2002 | Grant | B62D 55/30 180/9.1 |
| 6,637,834 | B2 * | 10/2003 | Elkow | B60B 11/00 301/36.1 |
| 6,763,288 | B2 | 7/2004 | Caretta et al. | |
| RE38,858 | E * | 11/2005 | Grawey | B62D 55/08 305/170 |
| 2006/0237239 | A1 * | 10/2006 | Bruner | B62D 55/12 180/9.1 |
| 2010/0059297 | A1 * | 3/2010 | Urbanik | B62D 55/108 180/6.7 |
| 2010/0077848 | A1 | 4/2010 | Ulicny et al. | |
| 2012/0037434 | A1 * | 2/2012 | Godin | B62D 55/14 180/9.1 |
| 2016/0139003 | A1 | 5/2016 | Posselius et al. | |
| 2021/0173399 | A1 * | 6/2021 | Richard | B60W 40/12 |

FOREIGN PATENT DOCUMENTS

| | | |
|---|---|---|
| WO | 2014121999 A1 | 8/2014 |
| WO | 2019046929 A1 | 3/2019 |

OTHER PUBLICATIONS

Supplementary European Search Report for EP 19858344.5 dated Aug. 29, 2022; Szaip, Andras.

Supplementary European Search Report for EP 19857372 dated Aug. 29, 2022; Szaip, Andras.

\* cited by examiner

VEHICLE AND TRACK SYSTEM WITH PRESSURE-ADJUSTABLE WHEELS

CROSS-REFERENCE TO RELATED APPLICATIONS

The present application claims priority to U.S. Provisional Patent Application Ser. No. 62/728,161, filed Sep. 7, 2018, entitled "Track System", U.S. Provisional Patent Application Ser. No. 62/728,669, filed Sep. 7, 2018, entitled "Track System", U.S. Provisional Patent Application Ser. No. 62/728,662, filed Sep. 7, 2018, entitled "Track System", U.S. Provisional Patent Application Ser. No. 62/728,673, filed Sep. 7, 2018, entitled "Track System", U.S. Provisional Patent Application Ser. No. 62/728,690, filed Sep. 7, 2018, entitled "Vehicle", and U.S. Provisional Patent Application Ser. No. 62/728,697, filed Sep. 7, 2018, entitled "Track System". Each one of these patent applications is incorporated by reference herein in its entirety.

TECHNICAL FIELD

The present technology relates to vehicles with track systems having pressure-adjustable wheels.

BACKGROUND

In at least some types of agriculture, soil health is important. When a vehicle is used on agricultural soil, for instance by driving over a field of crops, the vehicle compacts the soil in the field. In some cases, the compaction negatively affects soil health.

In order to reduce soil compaction, track systems have been developed to replace wheels of vehicles. For example, U.S. Patent Publication No. 2012/0242142 A1, published on Sep. 27, 2012, describes a track assembly for providing traction to a vehicle, such as an agricultural vehicle, a construction vehicle, or another work vehicle.

The prior art track assembly is mountable to an axle of the vehicle. The track assembly comprises a plurality of wheels comprising a leading idler wheel and a trailing idler wheel spaced apart in a longitudinal direction of the track assembly, an axis of rotation of the axle of the vehicle being located between an axis of rotation of the leading idler wheel and an axis of rotation of the trailing idler wheel in the longitudinal direction of the track assembly, and a driver wheel for rotating when the axle of the vehicle rotates. The track assembly also comprises an endless track extending around the wheels. The endless track comprises an inner side facing the wheels and a ground-engaging outer side for engaging the ground. The endless track engages the driver wheel such that rotation of the driver wheel imparts motion to the endless track.

SUMMARY

Prior art track systems may be suitable for their intended purposes; however, improvements to prior art are always desirable.

In view of the foregoing, in one aspect, the present technology provides a vehicle, including a vehicle frame, a motor supported by the vehicle frame, a plurality of track systems, each track system of the plurality of track systems having a track system frame supported by the vehicle frame, a drive wheel rotationally supported by the track system frame, the drive wheel being operatively connected to the motor to be driven by the motor, a plurality of leading idler wheels rotationally supported by the track system frame at a front portion thereof, a plurality of trailing idler wheels rotationally supported by the track system frame at a rear portion thereof, a plurality of mid-roller wheels rotationally supported by the track system frame between the front portion of the track system frame and the rear portion of the track system frame, each mid-roller wheel of the plurality of mid-roller wheels including a tire containing the fluid, and an endless track looped around the drive wheel, the plurality of leading idler wheels, the plurality of trailing idler wheels, and the plurality of mid-roller wheels. It is noted that while the idler wheels are variable pressure wheels as described, they do not need to be. For example, in some embodiments, the idler wheels are not part of a pressure adjustment system and are therefor not pressure adjustable. In some embodiments, the mid-rollers are not part of a pressure adjustment system, but the idler wheels are. It is also contemplated that yet other combinations of pressure-adjustable and non-pressure adjustable wheels could be used.

In some embodiments, the vehicle further includes a fluid pump operable with the fluid, a plurality of fluid lines containing the fluid and fluidly connecting the fluid pump to at least some of the plurality of mid-roller wheels of each track system of the plurality of track systems, the fluid pump being operable to pressurize the fluid in the plurality of fluid lines; a plurality of pneumatic inflation actuators, each pneumatic inflation actuator of the plurality of pneumatic inflation actuators being fluidly in one fluid line of the plurality of fluid lines, a plurality of pneumatic deflation actuators, each pneumatic deflation actuator of the plurality of pneumatic deflation actuators being fluidly in one fluid line of the plurality of fluid lines; and a system controller.

In some embodiments, the system controller is in electronic communication with the fluid pump, the plurality of pneumatic inflation actuators, and the plurality of pneumatic deflation actuators, the system controller being operable to selectively adjust fluid pressure in select ones of the mid-roller wheels of any one of the track systems of the vehicle by actuating corresponding ones of the plurality of pneumatic inflation actuators and the plurality of pneumatic deflation actuators.

In some embodiments, each leading idler wheel of the plurality of leading idler wheels includes a tire containing a fluid, the plurality of fluid lines fluidly connect the fluid pump to at least some of the plurality of leading idler wheels, and the system controller is operable to selectively adjust fluid pressure in select ones of the leading idler wheels and the mid-roller wheels of any one of the track systems of the vehicle by actuating corresponding ones of the plurality of pneumatic inflation actuators and the plurality of pneumatic deflation actuators.

In some embodiments, each trailing idler wheel of the plurality of trailing idler wheels includes a tire containing the fluid, the plurality of fluid lines fluidly connect the fluid pump to at least some of the plurality of trailing idler wheels, and the system controller is operable to selectively adjust fluid pressure in select ones of the leading idler wheels, the trailing idler wheels, and the mid-roller wheels of any one of the track systems of the vehicle by actuating corresponding ones of the plurality of pneumatic inflation actuators and the plurality of pneumatic deflation actuators.

In some embodiments, the endless track of each track system of the plurality of track systems comprises a pressure mat therein, the pressure mat being in electronic communication with the system controller and outputting a pressure signal to the system controller. In this document, the term "pressure mat" refers to a planar pressure sensor operable to sense pressures applied to different portions thereof, as is known in the art. It is contemplated that the "pressure mat" could be comprised of a single pressure-sensitive element, or multiple pressure-sensitive elements. It is contemplated that the pressure-sensitive element(s) could be implemented using suitable known technology. It is contemplated that the "pressure mat" could be comprised of a plurality of pressure sensors which are operable to sense pressures applied in their respective positions. In some embodiments, it is contemplated that at least some of the pressure sensors could be disposed in the wheel(s) of the track system instead of or in combination with being in the endless track(s) as described.

In some embodiments, the system controller is operable to selectively adjust fluid pressure in select ones of the leading idler wheels, the trailing idler wheels, and the mid-roller wheels of any one of the track systems of the vehicle by actuating the corresponding ones of the plurality of pneumatic inflation actuators and the plurality of pneumatic deflation actuators in response to the pressure signal received from the pressure mat of the endless track of each track system of the plurality of track systems.

In some embodiments, the endless track of each track system of the plurality of track systems comprises a pressure mat therein, the pressure mat being in electronic communication with the system controller and outputting a pressure signal to the system controller, and the system controller is operable to selectively adjust fluid pressure in select ones of the mid-roller wheels of any one of the track systems of the vehicle by actuating the corresponding ones of the plurality of pneumatic inflation actuators and the plurality of pneumatic deflation actuators in response to the pressure signal received from the pressure mat of the endless track of each track system of the plurality of track systems.

In some embodiments, the vehicle further comprises at least one slip sensor operable to detect slipping of at least one of the plurality of track systems of the vehicle, and wherein the system controller is operable to adjust fluid pressure in the tires of the at least one of the plurality of track systems in response to receiving a signal from the at least one slip sensor indicating slipping of the at least one of the plurality of track systems.

In some embodiments, the plurality of track systems includes a pair of front track systems, and a pair of rear track systems; and the system controller is operable to selectively adjust fluid pressure in select ones of the leading idler wheels, the trailing idler wheels, and the mid-roller wheels of any one of the front track systems.

In some embodiments, the system controller is operable to selectively adjust fluid pressure in select ones of the leading idler wheels, the trailing idler wheels, and the mid-roller wheels of any one of the front track systems while maintaining pressure of each tire of the rear track systems.

In some embodiments, the system controller is operable to selectively adjust fluid pressure in select ones of the leading idler wheels, the trailing idler wheels, and the mid-roller wheels of any one of the rear track systems.

In some embodiments, the system controller is operable to selectively adjust fluid pressure in select ones of the leading idler wheels, the trailing idler wheels, and the mid-roller wheels of any one of the rear track systems while maintaining pressure of each tire of the front track systems.

In some embodiments, the system controller is operable to selectively adjust fluid pressure in select ones of the leading idler wheels, the trailing idler wheels, and the mid-roller wheels of any one of the plurality of track systems while maintaining pressure of each tire of the rest of the plurality of track systems.

In some embodiments, the system controller is operable to selectively adjust fluid pressure in select ones of the mid-roller wheels of any one of the rear track systems.

In some embodiments, the system controller is operable to selectively adjust fluid pressure in select ones of the mid-roller wheels of any one of the rear track systems while maintaining pressure of each of the mid-roller wheels of the front track systems.

In some embodiments, the system controller is operable to selectively adjust fluid pressure in select ones of the mid-roller wheels of any one of the plurality of track systems while maintaining pressure of each tire of the mid-roller wheels of the rest of the plurality of track systems.

In some embodiments, the plurality of fluid lines fluidly connect the pressurized fluid storage tank to each tire of each track system of the plurality of track systems such that the leading idler wheels, the trailing idler wheels, and the mid-roller wheels of each track system of the plurality of track systems are pneumatically divided into an inner pneumatic group of wheels and an outer pneumatic group of wheels, fluid pressure in the inner pneumatic group of wheels being adjustable independent of fluid pressure in the outer pneumatic group of wheels.

In some embodiments, the plurality of fluid lines fluidly connect the pressurized fluid storage tank to each track system of the plurality of track systems such that the leading idler wheels, the trailing idler wheels, and the mid-roller wheels of each track system of the plurality of track systems are pneumatically divided into the inner pneumatic group of wheels and the outer pneumatic group of wheels, fluid pressure in the inner pneumatic group of wheels being adjustable independent of fluid pressure in the outer pneumatic group of wheels.

In some embodiments, the system controller monitors the pressure signal from the pressure mat of the endless track of each of the plurality of track systems to determine a pressure applied by each of the plurality of track systems to the endless track of that track system, and the system controller comprises a processor communicatively coupled to a non-transient memory, the non-transient memory storing instructions thereon which when executed by the processor cause the processor to determine a pressure difference between the pressure applied by a first track system of the plurality of track systems and the pressure applied by a second track system of the plurality of track, and actuate select ones of a sub-plurality of the plurality of pneumatic inflation actuators corresponding to the first track system and the second track system, and a sub-plurality of the plurality of pneumatic deflation actuators corresponding to the first track system and the second track system, to reduce the pressure difference.

In some embodiments, the track system frame of each of the plurality of track systems has a camber, and the system controller is operable to selectively adjust fluid pressure in select ones of the leading idler wheels, the trailing idler wheels, and the mid-roller wheels of any one of the track systems of the vehicle by actuating corresponding ones of the plurality of pneumatic inflation actuators and the plurality of pneumatic deflation actuators to adjust the camber of that one of the track systems.

In some embodiments, the system controller is operable to selectively adjust fluid pressure in select ones of the leading idler wheels, the trailing idler wheels, and the mid-roller wheels of any one of the track systems of the vehicle by actuating corresponding ones of the plurality of pneumatic inflation actuators and the plurality of pneumatic deflation actuators to adjust the camber of at least that one of the track systems.

In some embodiments, the fluid pump is an air pump and the fluid is air.

In some embodiments, the vehicle further comprises a pressurized air storage tank supported by the vehicle frame, the air pump being fluidly connected to the pressurized air storage tank and to the atmosphere, the air pump being operable to pressurize the pressurized air storage tank with air from the atmosphere.

In some embodiments, the fluid pump is a liquid pump and the fluid is a liquid.

In some embodiments, the liquid is an oil and the liquid pump is an oil pump.

In accordance with another aspect of the present technology, there is provided a vehicle including a vehicle frame, a motor supported by the vehicle frame, a fluid pump supported by the vehicle frame and operable with a fluid, a plurality of track systems, each track system of the plurality of track systems including a track system frame supported by the vehicle frame, a plurality of leading idler wheels rotationally supported by the track system frame at a front portion thereof, a plurality of trailing idler wheels rotationally supported by the track system frame at a rear portion thereof, a plurality of mid-roller wheels rotationally supported by the track system frame between the front portion of the track system frame and the rear portion of the track system frame, at least one of the plurality of leading idler wheels, the plurality of trailing idler wheels, and the plurality of mid-roller wheels including a tire containing the fluid, and an endless track looped around the plurality of leading idler wheels, the plurality of trailing idler wheels, and the plurality of mid-roller wheels. The vehicle further has a plurality of fluid lines containing the fluid and fluidly connecting the fluid pump to at least some of the plurality of leading idler wheels, trailing idler wheels and mid-roller wheels of each track system of the plurality of track systems, the fluid pump being operable to pressurize the fluid in the plurality of fluid lines. The vehicle further has a plurality of pneumatic inflation actuators, each pneumatic inflation actuator of the plurality of pneumatic inflation actuators being fluidly in one fluid line of the plurality of fluid lines. The vehicle further has a plurality of pneumatic deflation actuators, each pneumatic deflation actuator of the plurality of pneumatic deflation actuators being fluidly in one fluid line of the plurality of fluid lines. The vehicle further has a system controller being configured to connect to and control the fluid pump, the plurality of pneumatic inflation actuators, and the plurality of pneumatic deflation actuators, the system controller being operable to selectively adjust fluid pressure in select ones of the at least one the plurality of leading idler wheels, the plurality of trailing idler wheels, and the plurality of mid-roller wheels of any one of the track systems of the vehicle by actuating corresponding ones of the plurality of pneumatic inflation actuators and the plurality of pneumatic deflation actuators.

In some embodiments, at least one of the endless track and any one of the plurality of leading idler wheels, the plurality of trailing idler wheels, and the plurality of mid-roller wheels of each track system of the plurality of track systems comprises a pressure mat therein, the pressure mat being in electronic communication with the system controller and outputting a pressure signal to the system controller.

In some embodiments, the system controller is operable to selectively adjust fluid pressure in select ones of the leading idler wheels, the trailing idler wheels, and the mid-roller wheels of any one of the track systems of the vehicle by actuating the corresponding ones of the plurality of pneumatic inflation actuators and the plurality of pneumatic deflation actuators in response to the pressure signal received from the pressure mat of each track system of the plurality of track systems In some embodiments, the vehicle further includes at least one slip sensor operable to detect slipping of at least one of the plurality of track systems of the vehicle, and wherein the system controller is operable to adjust fluid pressure in the tires of the at least one of the plurality of track systems in response to receiving a signal from the at least one slip sensor indicating slipping of the at least one of the plurality of track systems.

In some embodiments, the plurality of track systems includes a pair of front track systems, and a pair of rear track systems, and the system controller is operable to selectively adjust fluid pressure in select ones of the leading idler wheels, the trailing idler wheels, and the mid-roller wheels of any one of the front track systems while maintaining pressure of each tire of the rear track systems.

In some embodiments, the plurality of track systems includes a pair of front track systems, and a pair of rear track systems, the system controller is operable to selectively adjust fluid pressure in select ones of the leading idler wheels, the trailing idler wheels, and the mid-roller wheels of any one of the rear track systems while maintaining pressure of each tire of the front track systems.

In some embodiments, the system controller is operable to selectively adjust fluid pressure in select ones of the leading idler wheels, the trailing idler wheels, and the mid-roller wheels of any one of the plurality of track systems while maintaining pressure of each tire of the rest of the plurality of track systems.

In some embodiments, the plurality of fluid lines fluidly connect the pressurized fluid storage tank to each track system of the plurality of track systems such that at least one of the leading idler wheels, the trailing idler wheels, and the mid-roller wheels of each track system of the plurality of track systems are pneumatically divided into an inner pneumatic group of wheels and an outer pneumatic group of wheels, fluid pressure in the inner pneumatic group of wheels being adjustable independent of fluid pressure in the outer pneumatic group of wheels.

In some embodiments, the plurality of fluid lines fluidly connect the pressurized fluid storage tank to each track system of the plurality of track systems such that the leading idler wheels, the trailing idler wheels, and the mid-roller wheels of each track system of the plurality of track systems are pneumatically divided into the inner pneumatic group of wheels and the outer pneumatic group of wheels, fluid pressure in the inner pneumatic group of wheels being adjustable independent of fluid pressure in the outer pneumatic group of wheels.

In some embodiments, the system controller monitors the pressure signal from the pressure mat of each of the plurality of track systems to determine a pressure applied by each of the plurality of track systems to the endless track of that track system, and the system controller includes a processor communicatively coupled to a non-transient memory, the non-transient memory storing instructions thereon which when executed by the processor cause the processor to determine a pressure difference between the pressure applied by a first track system of the plurality of track systems and the pressure applied by a second track system of the plurality of track, and actuate select ones of a sub-plurality of the plurality of pneumatic inflation actuators corresponding to the first track system and the second track system, and a sub-plurality of the plurality of pneumatic deflation actuators corresponding to the first track system and the second track system, to reduce the pressure difference.

In some embodiments, the track system frame of each of the plurality of track systems has a camber, and the system controller is operable to selectively adjust fluid pressure in select ones of at least one of the leading idler wheels, the trailing idler wheels and the mid-roller wheels of any one of the track systems of the vehicle by actuating corresponding ones of the plurality of pneumatic inflation actuators and the plurality of pneumatic deflation actuators to adjust the camber of at least that one of the track systems.

In some embodiments, the vehicle has a center of mass, and the system controller is operable to selectively adjust fluid pressure in select ones of the leading idler wheels, the trailing idler wheels, and the mid-roller wheels of any one of the track systems of the vehicle by actuating corresponding ones of the plurality of pneumatic inflation actuators and the plurality of pneumatic deflation actuators to shift a resultant force acting on the center of mass of the vehicle.

In some embodiments, the fluid pump is an air pump and the fluid is air, and the vehicle further has a pressurized air storage tank supported by the vehicle frame, the air pump being fluidly connected to the pressurized air storage tank and to the atmosphere, the air pump being operable to pressurize the pressurized air storage tank with air from the atmosphere.

In some embodiments, the fluid pump is a liquid pump and the fluid is a liquid.

In some embodiments, at least one track system of the plurality of track systems further includes a drive wheel rotationally supported by the track system frame of that one of the track systems, the drive wheel being operatively connected to the motor to be driven by the motor, and the endless track loops around the drive wheel, the plurality of leading idler wheels, the plurality of trailing idler wheels, and the plurality of mid-roller wheels.

According to yet another aspect of the present technology, there is provided a track system for a vehicle, having a track system frame, a plurality of leading idler wheels rotationally supported by the track system frame at a front portion thereof, a plurality of trailing idler wheels rotationally supported by the track system frame at a rear portion thereof, a plurality of mid-roller wheels rotationally supported by the track system frame between the front portion of the track system frame and the rear portion of the track system frame, at least one of the plurality of leading idler wheels, the plurality of trailing idler wheels, and the plurality of mid-roller wheels including a tire containing a fluid, and an endless track looped around the plurality of leading idler wheels, the plurality of trailing idler wheels, and the plurality of mid-roller wheels.

In some embodiments, at least one of the endless track and any one of the plurality of leading idler wheels, the plurality of trailing idler wheels, and the plurality of mid-roller wheels of the track system comprises a pressure mat therein, the pressure mat being in electronic communication with a system controller and outputting a pressure signal to the system controller.

In some embodiments, the track system is in communication with a system controller being configured to connect to and control a fluid pump, a plurality of pneumatic inflation actuators, and a plurality of pneumatic deflation actuators, the system controller being operable to selectively adjust the fluid pressure in the tire of the at least one of the plurality of leading idler wheels, the plurality of trailing idler wheels, and the plurality of mid-roller wheels.

In some embodiments, the track system frame has a camber, and the system controller is operable to selectively adjust fluid pressure in select ones of the tires of the at least one of the plurality of leading idler wheels, the plurality of trailing idler wheels, and the plurality of mid-roller wheels of the track system by actuating corresponding ones of the plurality of pneumatic inflation actuators and the plurality of pneumatic deflation actuators to adjust the camber of the track system.

In some embodiments, at least one of the plurality of leading idler wheels, the plurality of trailing idler wheels, and the plurality of mid-roller wheels of the track system are pneumatically divided into an inner pneumatic group of wheels and an outer pneumatic group of wheels, fluid pressure in the inner pneumatic group of wheels being adjustable independent of fluid pressure in the outer pneumatic group of wheels.

Should there be any difference in the definitions of term in this application and the definition of these terms in any document included herein by reference, the terms as defined in the present application take precedence.

Additional and/or alternative features, aspects, and advantages of embodiments of the present technology will become apparent from the following description, the accompanying drawings, and the appended claims.

BRIEF DESCRIPTION OF THE DRAWINGS

The drawings included herewith are for illustrating various embodiments of articles, products, methods, and apparatuses described in the present specification. The drawings are not to scale. Some features shown in the drawings are exaggerated, scaled down, or otherwise altered relative to their possible "life" size(s) and proportions in order to make the features more clearly visible and to aid the skilled reader in understanding the present technology.

For a better understanding of the present technology, as well as other aspects and further features thereof, reference is made to the following description which is to be used in conjunction with the accompanying drawings, where.

DETAILED DESCRIPTION

Figure 1:
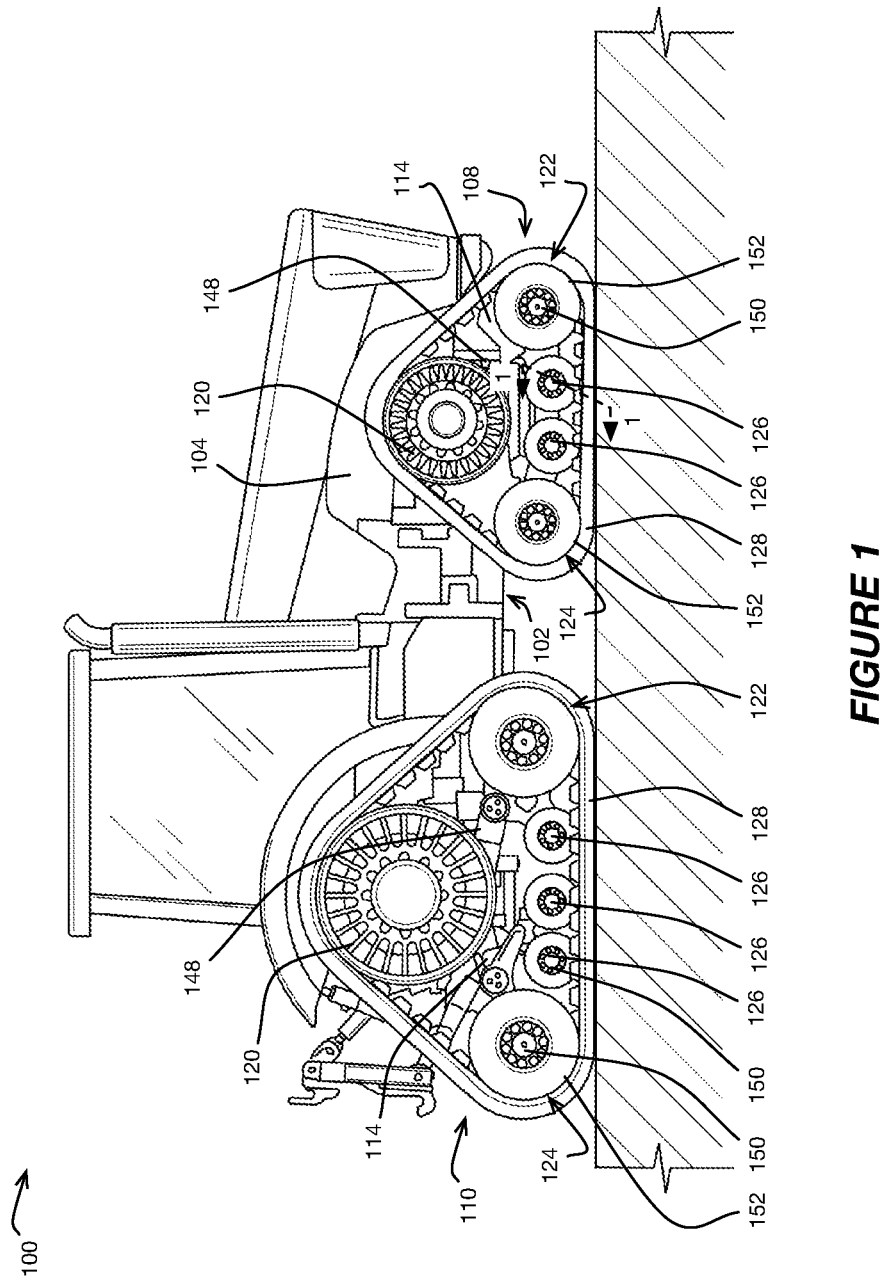
FIG. 1 is a schematic elevation view of a right side of a tractor.
Figure 2:
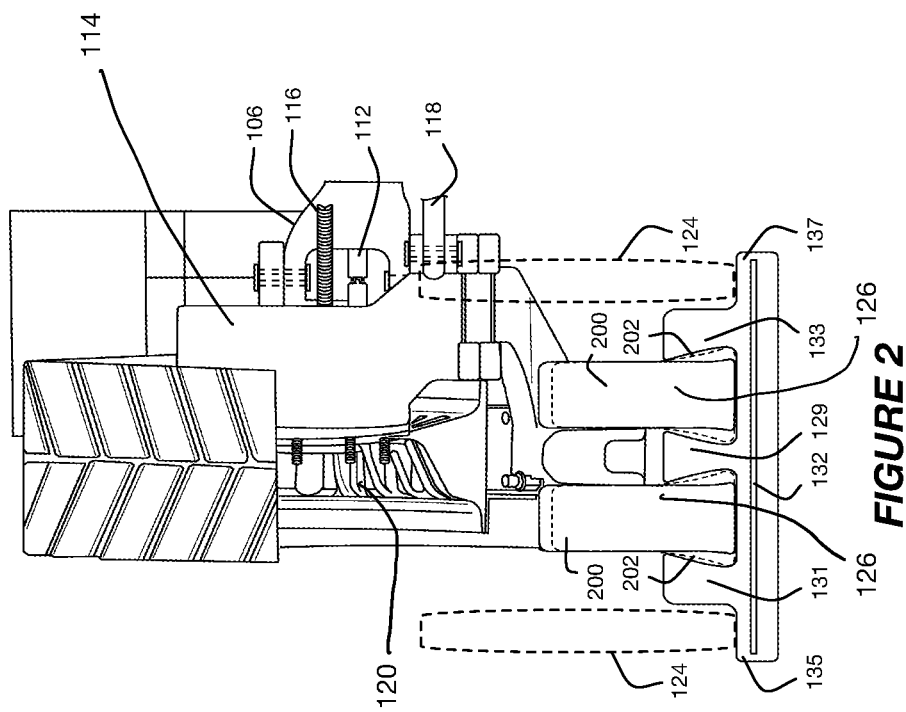
FIG. 2 is schematic elevation section view of a track system of the tractor of FIG. 1, taken along section line 1-1 of FIG. 1, the elevation view being in part sectioned to better show the construction of the track system.

Referring to FIGS. 1 and 2, a tractor 100 is shown. The tractor 100 is one example of a vehicle with which the present technology may be used. It is contemplated that the present technology could be used in other types of tracked vehicles. For example, while the tractor 100 is operable in all-wheel drive mode, it is contemplated that the present technology could be applied to vehicles that are not all-wheel drive vehicles. It is further contemplated that the present technology could be applied to track systems that are not driven, and hence do not necessarily have a drive wheel as described with regard to the non-limiting embodiments herein.

The tractor 100 has a vehicle frame 102, a motor 104 supported by the vehicle frame 102, four axle frames 106 (FIG. 2) supported by the vehicle frame 102. The tractor 100 further has a front right track system 108, a rear right track system 110 and front left track system (not shown) and a rear left track system (not shown), the four track systems 108, 110 supported on respective one of the four axle frames 106, the front right track system 108 supported on a front right one of the four axle frames 106, and the rear right track system 110 supported on a rear right one of the four axle frames 106. The front left one of the track systems 108, 110 is a mirror image of the front right track system 108. The rear left one of the track systems 108, 110 is a mirror image of the rear right track system 110. The four axle frames 106 are supported by and extend away from the vehicle frame 102. The rear axle frames 106 are mirror images of each other. The front axle frames 106 are mirror images of each other.

The axle frames 106 are elongate structural members that are made of steel in this embodiment. Each of the axle frames 106 is a single structural member. In some embodiments, one or more of the axle frames 106 is made of two or more structural members. Each of the four axle frames 106 has an aperture defined axially therethrough and receives therein a corresponding one of four drive axles 112. Each one of the drive axles 112 extends out of a corresponding one of the axle frames 106 and is connected to a corresponding one of the track systems 108, 110 for driving the corresponding one of the track systems 108, 110.

The drive axles 112 (FIG. 2) operatively connect the motor 104 to each one of their corresponding four track systems 108, 110 such that the four track systems 108, 110 propel the tractor 100. The four drive axles 112 of the vehicle include two front drive axles 112 and two rear drive axles 112. All four drive axles 112 of the tractor 100 are rotationally supported by the vehicle frame 102 and are operatively connected to the motor 104 via a transmission (not shown) and other drive train components to be driven thereby.

The front drive axles 112 are mirror images of each other. The rear drive axles 112 are mirror images of each other. It is contemplated that other vehicles with which the present technology could be used could have only two drive axles 112 and only two driven track systems. For example, some vehicles could have only front drive axles 112. As another example, some vehicles could have only rear drive axles 112.

In the present embodiment, each of the track systems 108, 110 includes a track system frame 114 mounted to an outer end of a corresponding one of the axle frames 106. In the present embodiment, the track system frames 114 of the rear track systems 110 are fixedly mounted to the corresponding ones of the rear axle frames 106. The track system frames 114 of the front track systems 108 are pivotably mounted to the corresponding ones of the front axle frames 106, for being steered. To this end, the tractor 100 has a steering system (not shown).

In the present embodiment, the steering system is a hydraulic steering system. The steering system includes a steering wheel (not shown) and steering links 116 operatively connecting the steering wheel to the front track systems 108. A front-right steering link 116 of the steering links 116 is positioned in front of the front-right axle frame 106 of the tractor 100. A front-left steering link 116 of the steering links 116 is positioned in front of the front-left axle frame 106 of the tractor 100. In other embodiments, the steering links 116 are positioned behind their respective axle frames 106. The steering links 116 of the tractor 100 are operable by an operator of the tractor 100 turning the steering wheel to steer the front track systems 108 of the tractor 100.

The steering system also includes a stabilization bar 118 that interconnects the front-right track system 108 with the front-left track system. The stabilization bar 118 maintains the front-right track system 108 parallel to the front-left track system during steering. However, the present technology may be employed with vehicles having a different steering system. In some embodiments, the stabilization bar 118 is omitted.

In the present embodiment, each of the track systems 108, 110 includes a drive wheel 120 that is rotationally supported by the track system frame 114 of that track system, and the drive wheel 120 is operatively connected to an outer end of a corresponding one of the drive axles 112 to be driven thereby. In the present embodiment, each drive wheel 120 is a friction-type drive wheel 120. Each of the track systems 108, 110 further includes a pair of leading idler wheels 122 rotationally supported at a front portion of the track system frame 114 and a pair of trailing idler wheels 124 rotationally supported at a rear portion of the track system frame 114.

Each of the front track systems 108 includes two pairs of mid-roller wheels 126 rotationally supported by the respective track system frame 114, at locations disposed between the front portion of the track system frame 114 and the rear portion of the track system frame 114. Each of the rear track systems 110 includes three pairs of mid-roller wheels 126 rotationally supported by the respective track system frame 114, at locations disposed between the front portion of the track system frame 114 and the rear portion of the track system frame 114. It is to be noted that the track system embodiments being described herein are merely non-limiting examples of particular implementations of the present technology. In other embodiments, the track systems have different numbers of idler wheels and/or mid-roller wheels. In some embodiments, the track systems have a drive wheel and a single idler wheel for example. In some embodiments, the track systems exclude mid-roller wheels. It is contemplated that the present technology could be applied to yet other wheel configurations.

The drive wheel 120, the leading idler wheels 122, the trailing idler wheels 124 and the mid-roller wheels 126 of each of the track systems 108, 110 have an endless track 128 extending thereabout. Each drive wheel 120 is in driving engagement with its corresponding endless track 128, for transferring torque thereto. Since in the present embodiment each of the drive wheels 120 is a friction-type drive wheel 120, each of the drive wheels 120 is in frictional engagement with the corresponding endless track 128. It is contemplated however that another drive wheel 120 and another corresponding endless track 128 could be used. In other embodiments, positive drive track systems 108, 110 are used.

Reference is now made to FIG. 2, which shows a pair of the mid-roller wheels 126 of the front right track system 108. In the present embodiment, each of the endless tracks 128 of the tractor 100 includes a longitudinally extending row of central guide lugs 129 disposed between the outer row of the mid-roller wheels 126 and the inner row of the mid-roller wheels 126. The central guide lugs 129 help maintain the alignment of the corresponding endless track 128 with the mid-roller wheels 126 and therefore also with the other wheels of the corresponding track system 108, 110. In the present embodiment, each of the endless tracks 128 of the tractor 100 further includes a longitudinally extending row of outer guide lugs 131 disposed on the outward side of the outer row of the mid-roller wheels 126, and a longitudinally extending row of inner guide lugs 133 disposed on the inward side of the inner row of the mid-roller wheels 126.

The outer guide lugs 131 and the inner guide lugs 133 further help maintain alignment of the corresponding endless track 128 with the mid-roller wheels 126 and therefore also with the other wheels of the corresponding track system 108, 110. Further in the present embodiment, each of the endless tracks 128 has laterally extending longitudinal flat portions 135, 137 that are disposed on the outward side of the outer guide lugs 131 and on the inward side of the inner guide lugs 133, respectively. The leading idler wheels 122 and the trailing idler wheels 124 of each of the track systems 108, 110 rolls on corresponding ones of the laterally extending longitudinal flat portions 135, 137 of the corresponding endless track 128. In FIG. 2, only the trailing idler wheels 124 are schematically shown to be visible by phantom lines and rolling on corresponding ones of the laterally extending longitudinal flat portions 135, 137, since the trailing idler wheels 124 are positioned rearward of the mid-roller wheels 126 and FIG. 2 is a sectional elevation view taken along cross-section line 1-1 of FIG. 1 and facing rearward. The leading idler wheels 122 roll on corresponding ones of the laterally extending longitudinal flat portions 135, 137 of the corresponding endless track 128 in a similar way.

Still referring to FIG. 2, each of the endless tracks 128 of the tractor 100 further includes a pressure mat 132 disposed therein and extending longitudinally at least through a portion thereof. The pressure mat 132 is a pressure sensing device that is capable of sensing the pressure applied to the endless track 128 across the width and ground contacting segment of the endless track 128. Each of the pressure mats 132 is in electronic communication with a system controller 134 (FIG. 4) of the tractor 100 via a suitable electronic connection. It is contemplated that other suitable technologies could be used to provide electronic communication between the pressure mats 132 and the system controller 134, and/or for the other electronically communicating components described herein.

Figure 4:
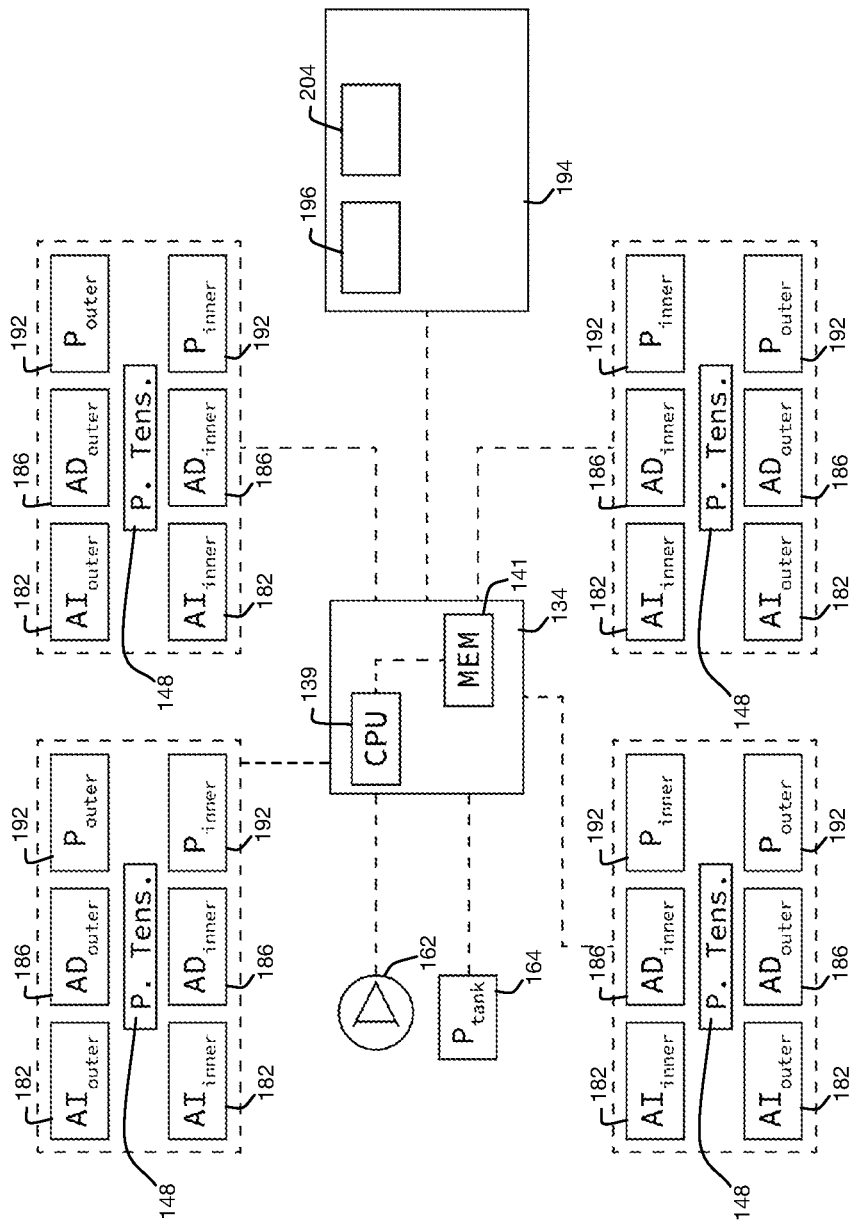
FIG. 4 is a schematic of electronic connections of the pressure adjustment system of FIG. 3.

The system controller 134 is supported by the vehicle frame 102 between the front right track system 108 and front left track system 108. It is contemplated that the system controller 134 could be located in any suitable location on the tractor 100. Referring to FIG. 4, the system controller 134 comprises a processor 139 communicatively coupled to a non-transient memory 141, the non-transient memory 141 storing instructions thereon which when executed by the processor 139 cause the system controller 134 to provide the functionality thereof as described in this specification. The system controller 134 and the other elements of a pressure adjustment system which will be described below (including the sensors, the actuators, and the pump described herein) are powered by the electrical system of the tractor 100.

Figure 3:
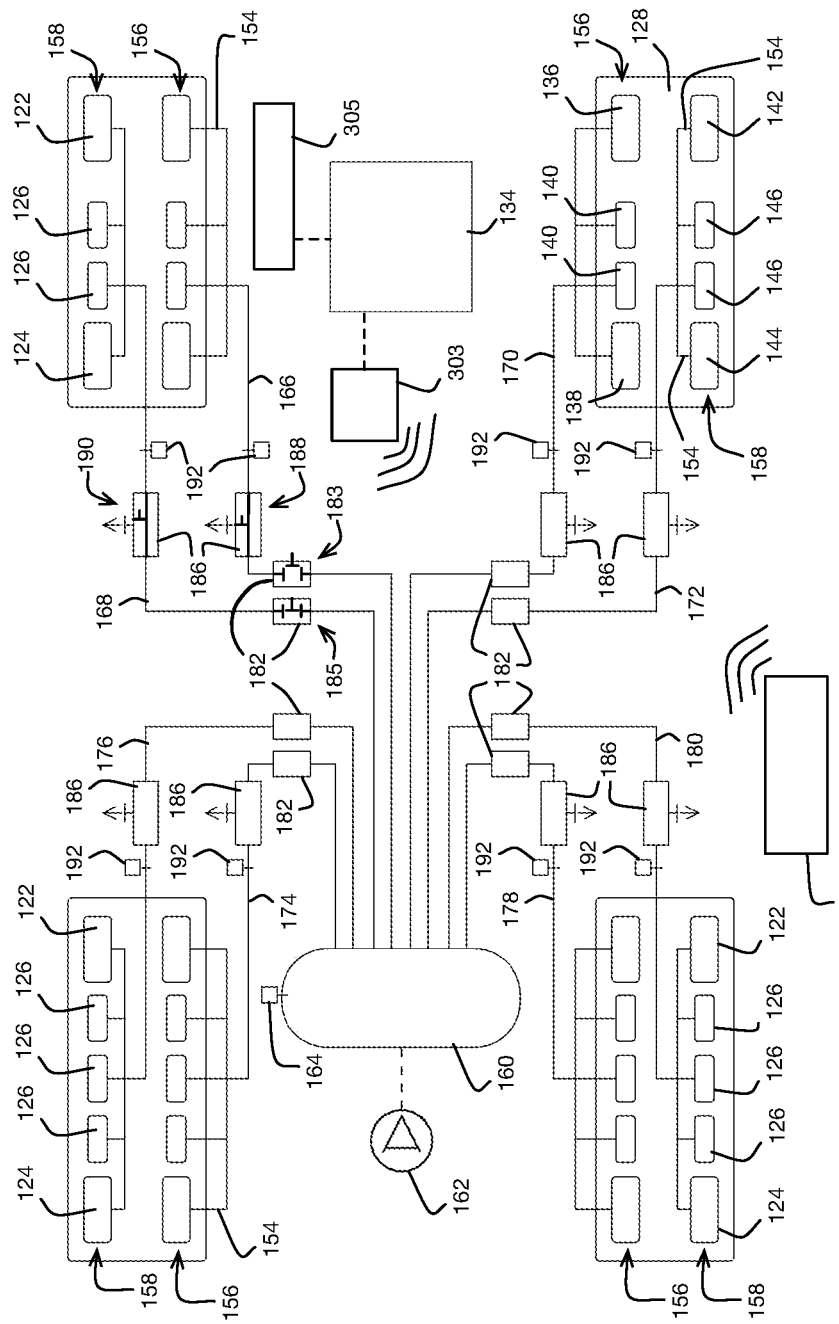
FIG. 3 is a schematic top plan view of a pressure adjustment system of the tractor of FIG. 1.

Referring to FIGS. 3 and 4, it is contemplated that any suitable electrical connections and power sources could be used. The system controller 134 is programmable and capable of running predetermined sequences and actions, such as to control the operation of the various pressure adjustment system components as described herein. In some embodiments, the system controller 134 is operatively connected to and is in communication with at least some control systems 305 of the tractor 100. In some embodiments, data provided by the control systems 305 of the tractor 100 is taken into account by the system controller 134 in addition to the signals from the various sensors described herein so as to provide a more complete representation of the status of the tractor 100 and track systems 108, 110 thereof.

In some circumstances, the system controller 134 is connected to a remote processing unit 301 via a communication device 303 such as a wireless communication device, and data provided and/or collected by the system controller 134 and/or the control systems 305 of the vehicle 60 is sent to the remote processing unit 301 wirelessly via the communication device 303. Referring to FIG. 3, the communication device 303 is provided on the tractor 100 and is operatively connected to the system controller 134. It is contemplated that other connections to the remote processing unit 301 could be used instead of or in addition to the wireless connection to the remote processing unit 301. In some embodiments, the system controller 134 is further configured to receive supplemental data related to, for example, weather records, soil conditions, etc. from the remote processing unit 301 via the communication device 303.

The pressure mat 132 of each of the track systems 108, 110 senses pressure applied by the leading idler wheels 122, the trailing idler wheels 124 and the mid-roller wheels 126 of that track system 108, 110 to the corresponding endless track 128 against terrain that the endless track 128 is on at any given point in time. Each of the pressure mats 132 generates a terrain pressure signal according to the sensed pressure. The terrain pressure signals are received by the system controller 134. In some embodiments, each of the endless tracks 128 of the tractor 100 includes a plurality of pressure mats 132. For example, in some embodiments, each of the endless tracks 128 of the tractor 100 includes a first pressure mat 132 disposed longitudinally under the outer row of the leading idler wheels 122 and the trailing idler wheels 124, on the outer laterally extending longitudinal flat portion 135, a second pressure mat 132 disposed longitudinally under the mid-roller wheels 126, and a third pressure mat 132 disposed longitudinally under the inner row of the leading idler wheels 122 and the trailing idler wheels 124, on the inner laterally extending longitudinal flat portion 137. Understandably, the outer row of the leading idler wheels 122 and the trailing idler wheels 124 is the row that is furthest away from the tractor 100, and the inner row of the leading idler wheels 122 and the trailing idler wheels 124 is the row that is closest to the tractor 100.

In the present embodiment, the terrain pressure signal generated by the pressure mat 132 of each of the track systems 108, 110 is indicative at least of: the pressure applied by the inner ones of the leading idler wheels 122, the trailing idler wheels 124 and the mid-roller wheels 126 of the corresponding track system 108, 110 and the pressure applied by the outer ones of the leading idler wheels 122, the trailing idler wheels 124 and the mid-roller wheels 126 of the corresponding track system 108, 110. In the embodiments comprising a dedicated pressure mat 132 for each row of wheels of each given track system 108, 110, a corresponding one of the readings/signals are obtained from each dedicated pressure mat 132.

For example, referring to the wheels of the front right track system 108, the pressure mat 132 of the front right track system 108 senses the pressures applied by the inner leading idler wheel 136, the inner trailing idler wheel 138 and the inner mid-roller wheels 140 against the endless track 128. The pressure mat 132 also senses the pressures applied by the outer leading idler wheel 142, the outer trailing idler wheel 144, and the outer mid-roller wheels 146 of the front right track system 108.

Accordingly, the terrain pressure signal generated by the pressure mat 132 of the front right track system 108 indicates to the system controller 134 the pressure applied to the endless track 128 by the inner leading idler wheel 136, the inner trailing idler wheel 138, and the inner mid-roller wheels 140 of the front right track system 108, and the pressure applied to the endless track 128 by the outer leading idler wheel 142, the outer trailing idler wheel 144, and the outer mid-roller wheels 146 of the front right track system 108. It is contemplated that for any one of, a combination of, or all of the track systems 108, 110, a first pressure mat 132 could be used to sense pressure applied by the inner leading idler wheel, the inner trailing idler wheel, and the inner mid-roller wheels, and a second pressure mat 132 could be used to sense pressure applied by the outer leading idler wheel, the outer trailing idler wheel, and the outer mid-roller wheels.

Each of the track systems 108, 110 further includes a hydraulic tension adjustment assembly 148, which could also be a dynamic tensioner for example, connected between the track system frame 114 and at least some of the wheels thereof. Each of the tension adjustment assemblies 148 is operable to sense tension in the respective endless track 128 and to adjust the tension in the respective endless track 128. More particularly, in the present embodiment, each of the tension adjustment assemblies 148 is in electronic communication with the system controller 134 of the tractor 100, as shown schematically in FIG. 4.

Each of the tension adjustment assemblies 148 generates a tension signal indicative of tension in the respective endless track 128 and sends it to the system controller 134. The system controller 134 monitors each of the tension signals and, based thereon, adjusts the tension in the respective endless track 128 to a given tension setpoint specified for the particular embodiment of the respective track system 108, 110. Furthermore, in the present embodiment, each of the leading idler wheels 122, the trailing idler wheels 124 and the mid-roller wheels 126 of each of the track systems 108, 110 includes a corresponding wheel hub 150 rotationally supported by the track system frame 114, and a pneumatic tire 152 mounted on the wheel hub 150. The wheel hub 150 and the pneumatic tire 152 can vary in size. In order to maintain clarity, only a few of the wheel hubs 150 and only a few of the tires 152 have been labeled in the accompanying Figures.

Each of the wheel hubs 150 includes a pneumatic connection 154, shown schematically in FIG. 3, to the respective pneumatic tire 152 mounted thereon. In order to maintain clarity, only a few of the pneumatic connections 154 have been labeled in the accompanying Figures. The pneumatic connections 154 allow for selectively inflating and deflating the tires 152 when the tractor 100 is in use, as described in more detail herein below. In the present embodiment, the inner leading idler wheel 136, the inner trailing idler wheel 138 and the inner mid-roller wheels 140 are fluidly interconnected and form an inner pneumatic group of wheels 156. The outer leading idler wheel 142, the outer trailing idler wheel 144, and the outer mid-roller wheels 146 are fluidly interconnected and form an outer pneumatic group of wheels 158.

In the present embodiment, the pneumatic groups of wheels 156, 158 of the tractor 100 are operated via a pressurized air storage tank 160 and an air pump 162 fluidly connected to the pressurized air storage tank 160. The pressurized air storage tank 160 and the air pump 162 are supported by the vehicle frame 102 between the rear right track system 110 and the rear left track system 110. It is contemplated that the pressurized air storage tank 160 and/or the air pump 162 could be located in any other suitable location on the vehicle 100. The pressurized air storage tank 160 is an example of a pressurized fluid storage tank 160. In some embodiments, the pressurized air storage tank 160 could be adapted to hold a different type of pressurized fluid, such as nitrogen and/or oil, depending on which fluid is used to operate the track systems of the present technology. In some embodiments, the pressurized air storage tank 160 is omitted.

In the present embodiment, the air pump 162 is operable to pump air from the atmosphere into the pressurized air storage tank 160, thereby increasing the pressure in the pressurized air storage tank 160. As shown, the pressurized air storage tank 160 includes an air pressure sensor 164 therein. The air pressure sensor 164 senses an air pressure in the pressurized air storage tank 160 and generates a pressure signal indicative of the air pressure in the pressurized air storage tank 160. The air pressure sensor 164 is in electronic communication with the system controller 134 of the tractor 100, for providing the pressure signal thereto.

In some embodiments, the air pump 162 is a different type of pump designed to operate with a gas other than air, and the idler wheels and the mid-roller wheels of the track systems 108, 110 (collectively, "support wheels") are accordingly filled with that gas. Accordingly, the pneumatic connections/lines/actuators described herein are adapted, where required, to be operable with the different gas. In some embodiments, the air pump 162 is a liquid pump, such as, including without limiting, an oil pump. In such embodiments, the various pneumatic connections/lines/actuators described herein are instead liquid connections/lines/actuators, and the idler wheels 122, 124 and the mid-roller wheels 126 of the track systems 108, 110, are filled with the liquid with which the liquid pump is operable. It is contemplated that in embodiments where the fluid is not air, the pump 162 could form a closed fluid system whereby the different fluid would be contained within the closed fluid system. It is contemplated that additional corresponding components, such as expansion bladders, could be used in some such different embodiments to provide for the pressurization functions described in this document.

In the present embodiment, if the air pressure in the pressurized air storage tank 160 drops below a predetermined threshold value, the system controller 134 receives a pressure signal from the air pressure sensor 164 of the pressurized air storage tank 160. In response, the system controller 134 operates the air pump 162 to pressurize the pressurized air storage tank 160 to a pre-determined pressure setpoint. In the present embodiment, the pre-determined pressure setpoint is higher than maximum operating pressures of the idler wheels 122, 124 and the mid-roller wheels 126 of the track systems 108, 110. In other embodiments, the pre-determined pressure setpoint could be different.

As shown in FIG. 3, the inner pneumatic group of wheels 156 of the front left track system 108 includes the inner one of the leading idler wheels 122, the inner ones of the mid-roller wheels 126, and the inner one of the trailing idler wheels 124 thereof. The inner pneumatic group of wheels 156 of the front left track system 108 is fluidly connected to the pressurized air storage tank 160 via a first pneumatic line 166, as shown in FIG. 3. The outer pneumatic group of wheels 158 of the front left track system 108 includes the outer leading idler wheel 122, the outer ones of the mid-roller wheels 126, and the outer trailing idler wheel 124 thereof. The outer pneumatic group of wheels 158 of the front left track system 108 is connected pneumatically to the pressurized air storage tank 160 via a second pneumatic line 168, as shown in FIG. 3. It is noted that FIG. 3 is a schematic. In FIG. 3, some of the relative positions of the wheels of the track systems 108, 110 have been changed to improve clarity.

The inner pneumatic group of wheels 156 of the front right track system 108 includes the inner leading idler wheel 136, the inner mid-roller wheels 140, and the inner trailing idler wheel 138 thereof. The inner pneumatic group of wheels 156 of the front right track system 108 is connected pneumatically to the pressurized air storage tank 160 via a third pneumatic line 170, as shown in FIG. 3. The outer pneumatic group of wheels 158 of the front right track system 108 includes the outer leading idler wheel 142, the outer mid-roller wheels 146, and the outer trailing idler wheel 144 thereof. The outer pneumatic group of wheels 158 of the front right track system 108 is connected pneumatically to the pressurized air storage tank 160 via a fourth pneumatic line 172, as shown in FIG. 3.

The inner pneumatic group of wheels 156 of the rear left track system 110 includes the inner one of the leading idler wheels 122, the inner ones of the mid-roller wheels 126, and the inner one of the trailing idler wheels 124 thereof. The inner pneumatic group of wheels 156 of the rear left track system 110 is connected pneumatically to the pressurized air storage tank 160 via a fifth pneumatic line 174, as shown in FIG. 3. The outer pneumatic group of wheels 158 of the rear left track system 110 includes the outer one of the leading idler wheels 122, the outer ones of the mid-roller wheels 126, and the outer one of the trailing idler wheels 124 thereof. The outer pneumatic group of wheels 158 of the rear left track system 110 is connected pneumatically to the pressurized air storage tank 160 via a sixth pneumatic line 176, as shown in FIG. 3.

The inner pneumatic group of wheels 156 of the rear right track system 110 includes the inner one of the leading idler wheels 122, the inner ones of the mid-roller wheels 126, and the inner trailing idler wheel 124 thereof. The inner pneumatic group of wheels 156 of the rear right track system 110 is connected pneumatically to the pressurized air storage tank 160 via a seventh pneumatic line 178, as shown in FIG. 3. The outer pneumatic group of wheels 158 of the rear right track system 110 includes the outer one of the leading idler wheels 122, the outer ones of the mid-roller wheels 126, and the outer one of the trailing idler wheel 124 thereof. The outer pneumatic group of wheels 158 of the rear right track system 110 is connected pneumatically to the pressurized air storage tank 160 via an eighth pneumatic line 180, as shown in FIG. 3.

Still referring to FIG. 3, each of the pneumatic lines 166, 168, 170, 172, 174, 176, 178 and 180 includes a pneumatic inflation actuator 182 therein. Each of the pneumatic inflation actuators 182 controls airflow from the pressurized air storage tank 160 to a respective one of the pneumatic group of wheels 156, 158.

In the present embodiment, each of the pneumatic inflation actuators 182 is an on-off type of actuator that has an open position in which that pneumatic inflation actuator 182 allows air from the pressurized air storage tank 160 to the tire 152 of the respective one of the pneumatic group of wheels 156, 158, and a closed position in which that pneumatic inflation actuator 182 prevents airflow from the pressurized air storage tank 160 to the tire 152 of the respective one of the pneumatic group of wheels 156, 158. As an example only, in FIG. 3, the pneumatic inflation actuator 182 of pneumatic line 166 is schematically shown in its closed position 183, and the pneumatic inflation actuator 182 of pneumatic line 168 is schematically shown in its open position 185.

Still referring to FIG. 3, each of the pneumatic lines 166, 168, 170, 172, 174, 176, 178 and 180 further includes a pneumatic deflation actuator 186 therein. As shown, each pneumatic deflation actuator 186 is downstream of its respective pneumatic inflation actuator 182. In the present embodiment, each pneumatic deflation actuator 186 is an on-off type of actuator that has an open position in which that pneumatic deflation actuator 186 allows the venting of air from the tire 152 of the respective one of the pneumatic group of wheels 156, 158 to the atmosphere, and a closed position in which that pneumatic deflation actuator 186 prevents the venting of air from the tire 152 of the respective one of the pneumatic group of wheels 156, 158 to the atmosphere. In the present embodiment, in closed position, each pneumatic deflation actuator 186 is simply part of the respective one of the pneumatic lines 166, 168, 170, 172, 174, 176, 178 and 180 and does not impede airflow through the respective one of the pneumatic lines 166, 168, 170, 172, 174, 176, 178 and 180. As an example only, in FIG. 3, the pneumatic deflation actuator 186 of pneumatic line 166 is schematically shown in its open position 188, and the pneumatic deflation actuator 186 of pneumatic line 168 is schematically shown in its closed position 190.

It is contemplated that where the wheel pressure control system of the present technology uses a fluid other than air, as described herein above, the inflation actuators 182 and the deflation actuators 186 would be different and would be selected to work with the different type of fluid. For example, where the wheel pressure control system of the present technology uses an oil instead of air (or another gas), the inflation actuators 182 could be suitable oil flow control valves, and the deflation actuators 186 could be oil flow diversion valves selectively diverting oil to a suitable reservoir for reducing oil pressure in the respective ones of the tires instead of venting air to the atmosphere.

Still referring to FIG. 3, in the present embodiment, each of the pneumatic lines 166, 168, 170, 172, 174, 176, 178 and 180 further includes an air pressure sensor 192 therein, downstream of the respective pneumatic deflation actuator 186. Each air pressure sensor 192 senses an air pressure in the respective one of the pneumatic groups of wheels 156, 158, and generates a pressure signal that is indicative of this air pressure. Each air pressure sensor 192 is in electronic communication with the system controller 134 and sends the respective pressure signal thereto. It is contemplated that where the wheel pressure control system of the present technology uses a fluid other than air, as described herein above, the pressure sensors 192 would be different and would be selected to work with the different type of fluid. For example, where the wheel pressure control system of the present technology uses oil instead of air, the pressure sensors 192 would be oil pressure sensors.

In the present embodiment, the system controller 134 monitors the air pressure in each pneumatic group of wheels 156, 158 using the respective air pressure sensor 192. It is contemplated that where the wheel pressure control system of the present technology uses a fluid other than air, as described herein above, the system controller 134 would monitor the pressure of the fluid other than air in each (in such embodiments, non-pneumatic) group of wheels 156, 158 using the respective fluid pressure sensors 192 selected for the specific fluid.

In the present embodiment, the system controller 134 controls air pressure in each pneumatic group of wheels 156, 158 in response to the pressure signal received from the respective air pressure sensor 192 and/or in response to at least one other signal received from at least one other sensor of the tractor 100 and/or in response to at least one input received from an operator of the tractor 100, as described in more detail herein below. It is contemplated that where the wheel pressure control system of the present technology uses a fluid other than air, as described herein above, the system controller 134 would control the pressure of the fluid other than air in each (in such embodiments, non-pneumatic) group of wheels 156, 158 in response to the pressure signal received from the respective fluid pressure sensors 192 selected for the specific fluid and/or in response to at least one other signal received from at least one other sensor of the tractor 100 and/or in response to at least one input received from an operator of the tractor 100, as described in more detail herein below.

The system controller 134 controls air pressure in each group of wheels 156, 158 by selectively operating the respective inflation actuator 182 to the appropriate closed or open position and the respective deflation actuator 186 to the appropriate closed or open position. In the present embodiment, the system controller 134 controls fluid pressure (in the present embodiment, air) in each group of wheels 156, 158 (in the present embodiment, pneumatic group) independently of fluid pressure in the rest of the groups of wheels 156, 158.

For example, the system controller 134 may actuate the inflation actuator 182 associated with the inner group of wheels 156 of the rear right track system 110 to its open position to increase fluid (in the present embodiment, air) pressure in this inner group of wheels 156, and may actuate the deflation actuator 186 associated with the outer group of wheels 158 of the rear right track system 110 to its open position to decrease fluid (in the present embodiment, air) pressure in this outer group of wheels 158. In some cases, the system controller 134 may execute these two actuation actions simultaneously. In some cases, the system controller 134 may execute these two actuation actions in a sequence. The purpose of having different pressures in the inner group of wheels 156 and in the outer group of wheels 158 will become apparent in the following description.

Pressure Adjustment: Road vs Field

Referring to FIG. 4, in some embodiments, the system controller 134 is operable to adjust fluid pressure in all of the wheels of the track systems 108, 110 of the tractor 100 to improve driving characteristics thereof when driving on particular types of terrain. To this end, in some embodiments, the system controller 134 is electronically connected to a control console 194 disposed inside a driver cockpit of the vehicle 100. In some embodiments, the control console 194 includes a mode selector 196 operable to at least two different positions.

Each of the at least two different positions of the mode selector 196 may correspond to a fluid pressure setting/mapping for the wheels of the track systems 108, 110 of the tractor 100 that is pre-defined for a particular type of terrain. In some embodiments, the mode selector 196 is provided in the form of one or more toggle switches. In some embodiments, the mode selector 196 is provided in the form of a dial rotatable to a plurality of different angular positions. In some embodiments, the mode selector 196 is provided via a touchscreen with a corresponding graphical user interface displayed thereon. It is contemplated that the mode selector 196 could be provided via any other suitable element or system.

In some embodiments, the mode selector 196 is operable to select a "roading" position and a "field operation" position. The "roading" position and the "field operation" position each define a pressure setpoint for each of the groups of wheels 156, 158 of the tractor 100. The pressure setpoint defined by the "roading" position is higher than the pressure defined by the "field operation" position. Each tire 152 has a certain patch area that comes into contact with the corresponding endless track 128.

The higher pressure setpoint of the "roading" position reduces the area of the patch of each of the tire 152 that contacts the corresponding endless track 128, and thereby reduces rolling friction of that tire 152 with the corresponding endless track 128. The "roading" operating condition of the mid-roller wheels 126 being at the higher pressure setpoint is illustrated in FIG. 2 with reference numeral 200. The "roading" operating condition may be used to drive the tractor 100 over paved roads.

The lower pressure setpoint of the "field operation" position increases the area of the patch of each of the tire 152 that contacts the corresponding endless track 128, and thereby reduces the pressure applied by that tire 152 to the corresponding endless track 128. The "field operation" operating condition of the mid-roller wheels 126 being at the lower pressure setpoint is illustrated in FIG. 2 with reference numeral 202 with the phantom lines representing the mid-roller wheels 126 having their tire 152 inflated to the lower pressure setpoint. In this operating condition, the leading idler wheels 122 and the trailing idler wheels 124 are in similar corresponding lower pressure states. The corresponding lower pressure states of the leading idler wheels 122 and the trailing idler wheels 124 are not shown in FIG. 2 to maintain clarity thereof. In FIG. 1, however, the front right side track system 108 shows the leading and trailing idler wheels 122, 124 in "field operation" position, and the rear right side track system 110 in the "roading" position. In some cases, the "field operation" operating condition may decrease soil compaction and improve traction of the tractor 100. It is contemplated that the particular magnitudes of the higher pressure setpoint(s) and the lower pressure setpoint(s) would be selected based on the particular tire(s) used in the groups of wheels 156, 158 of the tractor 100.

Automatic Tension Adjustment

In some cases, depending on the extent of the change of pressure in the tire(s) 152 of one or more of the track systems 108, 110, and the corresponding change(s) in the effective diameter(s) of the tire(s) 152, the system controller 134 may operate the tension adjustment assembly 148 of the one or more track systems in order to maintain a suitable amount of tension in the endless track 128 of the one or more track systems 108, 110. More particularly, in response to receiving a tension signal from a given tension adjustment assembly 148 indicative of the tension of the endless track 128 of the one or more track systems 108, 110 being too low or too high, the system controller 134 operates the given tension adjustment assembly 148 to correct the tension in that endless track 128. It is contemplated that in some embodiments, the automatic tension adjustment assemblies 148 may be omitted.

Pressure Adjustment: Slip Reduction

In some embodiments, the system controller 134 is operable to decrease fluid pressure in the tires 152 of the rear track systems 110 of the tractor 100 while maintaining a given pressure in the tires 152 of the front track systems 108 of the tractor 100. This inflation configuration may help improve traction of the rear track systems 110.

In some embodiments, the system controller 134 is operable to decrease fluid pressure in the tires 152 of the front track systems 108 of the tractor 100 while maintaining a given pressure in the tires 152 of the rear track systems 110 of the tractor 100. This inflation configuration may help improve traction of the front track systems 108.

In some embodiments, the system controller 134 is operable to decrease fluid pressure in the tires 152 of both the rear left track system 110 and the front right track system 108, while maintaining pressure in the tires 152 of the rear right track system 110 and the front left track system 108. This inflation configuration may help improve traction when the tractor 100 is stuck in some particular soil conditions.

In some embodiments, the system controller 134 is operable to decrease fluid pressure in the tires 152 of both the rear right track system 110 and the front left track system 108, while maintaining pressure in the tires 152 of the rear left track system 110 and the front right track system 108. This inflation configuration may help improve traction when the tractor 100 is stuck in some particular soil conditions.

In some embodiments, the system controller 134 is operable to decrease fluid pressure in the tires 152 of both the front track systems 108 of the tractor 100 and the rear track systems 110 of the tractor 100. This inflation configuration may help improve traction of both the rear track systems 110 and the front track systems 108. In one example, this inflation configuration may be used when all of the track systems 108, 110 of the tractor 100 are stuck in mud and are experiencing slip. In some such cases, this inflation configuration may help the tractor 100 extricate itself from the mud.

In some embodiments, the system controller 134 is operable to decrease fluid pressure in the tires 152 of the front left track system and maintain the pressure in the front right track system 108, and to decrease fluid pressure in the tires 152 of the rear left track system and maintain the pressure in the rear right track system 110. In this inflation configuration, steering the tractor 100 to the left can be facilitated under certain conditions.

In some embodiments, the system controller 134 is operable to decrease fluid pressure in the tires 152 of any one of the track systems 108, 110 of the tractor 100 while maintaining pressure in the tires 152 of the other ones of the track systems 108, 110 of the tractor 100. These inflation configurations may help improve traction when the tractor 100 is stuck in some particular soil conditions. For example, when the rear right track system 110 of the tractor 100 is stuck in a mud hole and is experiencing slip, the system controller 134, either automatically or via input from an operator of the tractor 100, may reduce the fluid pressure in the tires 152 of the rear right track system 110 to help the rear right track system 110 of the tractor 100 extricate itself from the mud hole.

In some embodiments, the control console 194 includes an additional mode selector 204 operable to two or more different positions, for selecting one or more of the above-mentioned different tire inflation configurations. In some embodiments, the mode selector 204 is provided in the form of one or more toggle switches. In some embodiments, the mode selector 204 is provided in the form of a dial rotatable to a plurality of different angular positions. In some embodiments, the mode selector 204 is provided via a touchscreen with a corresponding graphical user interface displayed thereon. It is contemplated that the mode selector 204 could be provided via any other suitable element or system.

In some embodiments, one of the different positions of the mode selector 204 may correspond to a "normal" operating mode in which the mode selector 204 does not override the operation of the system controller 134. In some embodiments, each of the other one(s) of the different positions may correspond to a particular one of the above-mentioned inflation configurations. Accordingly, the mode selector 204 may have a number of different positions to enable an operator of the tractor 100 to select any one of the above-mentioned different tire inflation configurations.

In some embodiments, the mode selector 196 may incorporate the functions of the mode selector 204, or vice versa, and thus in some embodiments the mode selector 204 may be omitted. It is contemplated that any other user input system may be used for enabling an operator of the tractor 100 to select at some of the above-mentioned inflation configurations.

An operator of the tractor 100 may, upon the tractor 100 becoming stuck in mud or in another soil condition, operate the mode selector 196 and/or the mode selector 204 from the "normal" position to a desired one of the different respective positions depending on the particular circumstances and conditions of the soil in which the tractor 100 is stuck. The operator may thereby reconfigure the corresponding one(s) of the track systems 108, 110 to a desired inflation configuration. In some cases, this may improve traction and help drive the tractor 100 out of its stuck position.

In some embodiments, the tractor 100 has one or more slip sensors that detect when one or more of the track systems 108, 110 experience slip. In such implementations, the system controller 134 may be in electronic communication with the one or more slip sensors. In response to receiving corresponding slip signal(s) from the one or more slip sensors indicating the slip condition(s), the system controller 134 may deflate the tires 152 of the track system(s) experiencing slip at a given point in time. In some embodiments in which the mode selector 196 and/or the mode selector 204 are present, an operator of the tractor 100 may operate the mode selector 196 and/or the mode selector 204 to override the automatic pressure adjustment provided by the system controller 134.

Pressure Adjustment: Incline Driving

In some embodiments, the system controller 134 may monitor the terrain pressure signals received from the pressure mats 132 and may adjust fluid pressure in select ones of the groups of wheels 156, 158 to reduce differences in the terrain pressures applied by the tires 152 of the track systems 108, 110 to the corresponding ones of the endless tracks 128.

Figure 5:
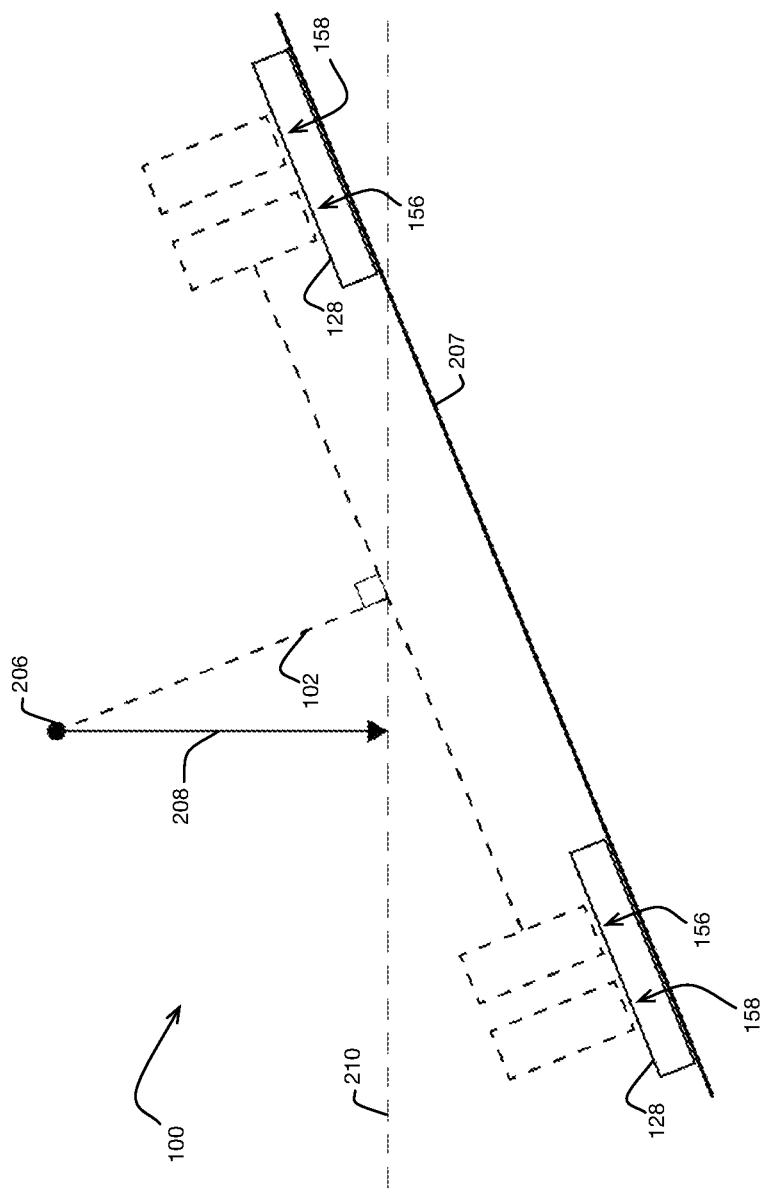
FIG. 5 is a schematic rear elevation view of rear endless tracks of the tractor of FIG. 1, the tractor driving along an inclined terrain, with a rear left one of the endless tracks being below a rear right one of the endless tracks.

For example, FIG. 5 schematically shows the tractor 100 from its rear end, driving along an inclined terrain 207. As shown, a center of mass 206 of the tractor 100 is represented, with gravity 208 acting thereon. The forces exerted by gravity 208 (represented by the arrow 208) are closer to the left track systems 108, 110 along a horizontal reference plane 210 than the right track system 108, 110. The left track systems 108, 110 therefore carry more of the vehicle's 100 weight. Therefore, the tires 152 apply higher pressures on the respective left side endless tracks 128 than the tires 152 on the right track systems 108, 110 of the tractor 100 on the respective right side endless tracks 128.

In some embodiments, the system controller 134 is configured to change fluid pressures in the tires 152 in select ones of the track systems 108, 110 in response to detecting such a load distribution. For example, in some embodiments, the system controller 134 is configured to detect such a load distribution via the signals received from the pressure mats 132 of the tractor 100.

In one particular example, in response to detecting the load distribution in the endless tracks 128 resulting from the position of the tractor 100 shown in FIG. 5, the system controller 134 may operate the pneumatic inflation actuators 182 of the left side track systems 108, 110 to increase air pressures in the tires 152 of the left side track systems 108, 110 and may thereby increase the effective radii of the tires 152 of the left side track systems 108, 110. Increased radii raise the left side of the tractor 100 relative to the right side of the tractor 100, and thereby shift the forces 208 acting on the center of mass 206 rightward, toward the right side track systems 108, 110. This may redistribute the loading on the endless tracks 128 of the tractor 100.

More particularly, this may help reduce the loads applied by the tires 152 of the left side track systems 108, 110 on the respective left side endless tracks 128 and may increase the loads applied by the tires 152 of the right side track systems 108, 110 on the respective right side endless tracks 128. This may create a relatively more even load distribution between the left side track systems 108, 110 and the right side track systems 108, 110. In some cases, this may help reduce soil compaction. In some cases, this may help improve the vehicle's 100 stability on inclined terrain.

In some embodiments, the system controller 134 may operate the pneumatic deflation actuators 186 of the right side track systems 108, 110 to reduce fluid pressure(s) in the tires 152 of the right side track systems 108, 110 and thereby decrease the effective radii of the tires 152 of the right side track systems 108, 110. In some cases, this may lower the right side of the tractor 100 relative to the left side of the tractor 100 and may thereby further shift the center of mass 206 rightward toward the right side track systems 108, 110. In some cases, this may help further reduce the differences between the pressures applied by the tires 152 of the right side track systems 108, 110 on the respective right side endless tracks 128 and the loads applied by the tires 152 of the left side track systems 108, 110 on the respective left side endless tracks 128. In some embodiments, the system controller 134 may reduce fluid pressure(s) in the tires 152 of the right side track systems 108, 110 and increase fluid pressure(s) in the tires 152 of the left side track systems 108, 110.

Figure 6:
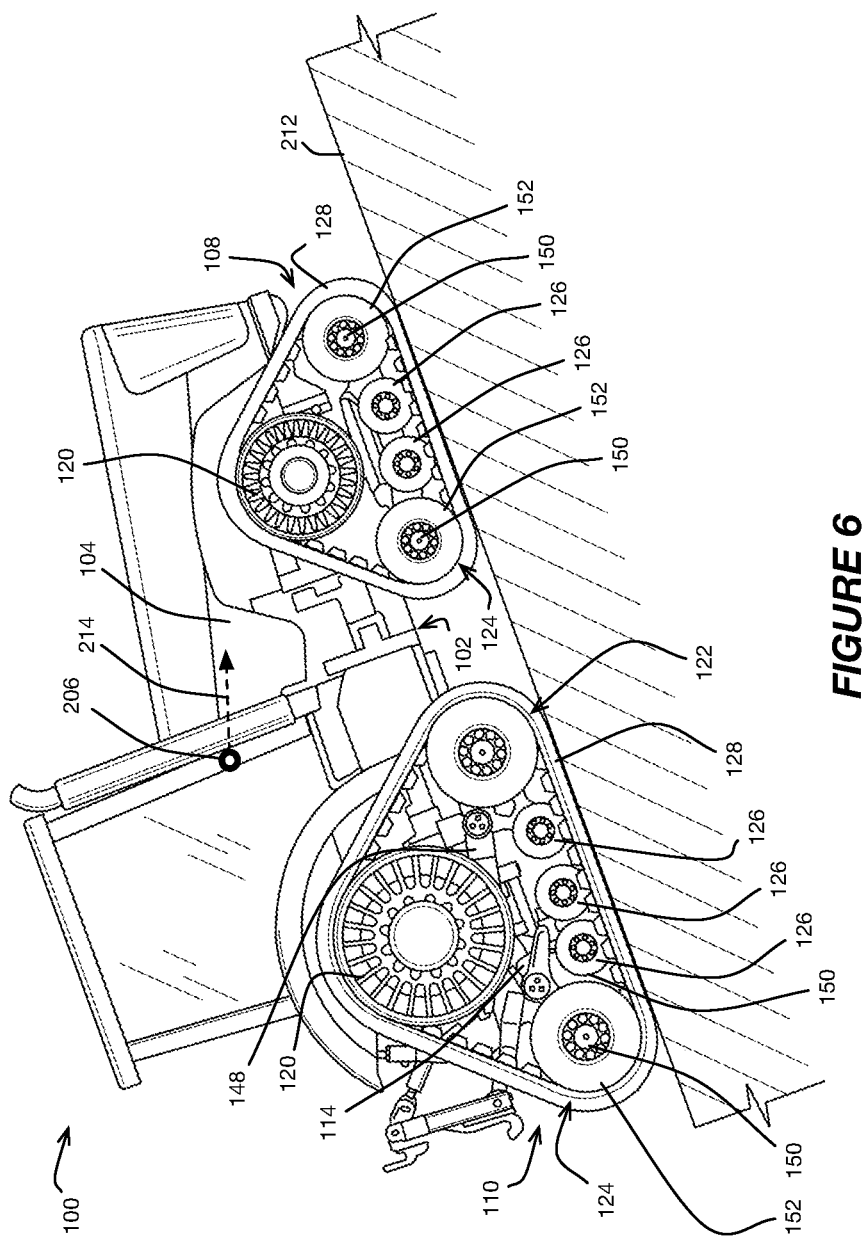
FIG. 6 is schematic elevation view of the right side of the tractor of FIG. 1, the tractor driving upward against an inclined terrain.

In some embodiments, the system controller 134 is further configured to reduce differences in loads applied by the tires 152 to the respective front endless tracks 128 of the front track systems 108 and the loads applied by the tires 152 to the respective rear endless tracks 128 of the rear track systems 110 when the tractor 100 is driving upward on inclined terrain. As an example, FIG. 6 shows the tractor 100 going up an inclined terrain 212.

In some embodiments, the system controller 134 is configured to operate the deflation actuators 186 of the front track systems 108 to decrease the effective radii of the tires 152 thereof and/or to operate the inflation actuators 182 of the rear track systems 110 to increase the effective radii of the tires 152 thereof. In some cases, this shifts the center of mass 206 of the tractor 100 forward, closer to the front track systems 108, as shown with reference arrow 214. This may increase the load applied by the tires 152 of the front track systems 108 to the respective front endless tracks 128 (further herein, "front track loads") and may decrease the loads applied by the tires 152 of the rear track systems 110 to the respective rear endless tracks 128 (further herein, "rear track loads"). In some cases, this may reduce the differences between the front track loads and the rear track loads. This may create a relatively more even load distribution between the front track systems 108 and the rear track systems 110. In some cases, this may help reduce soil compaction. In some cases, this may help improve the tractor's 100 stability on the inclined terrain.

In some of the embodiments comprising the automatic tension adjustment assemblies 148, the system controller 134 operates respective ones of the automatic tension adjustment assemblies 148 to compensate for the changes in tension in the various endless tracks 128 resulting from changes in the effective radii of the various tires 152 and thereby maintains operational tensions in the endless tracks 128.

Combine Harvesters

Figure 7:
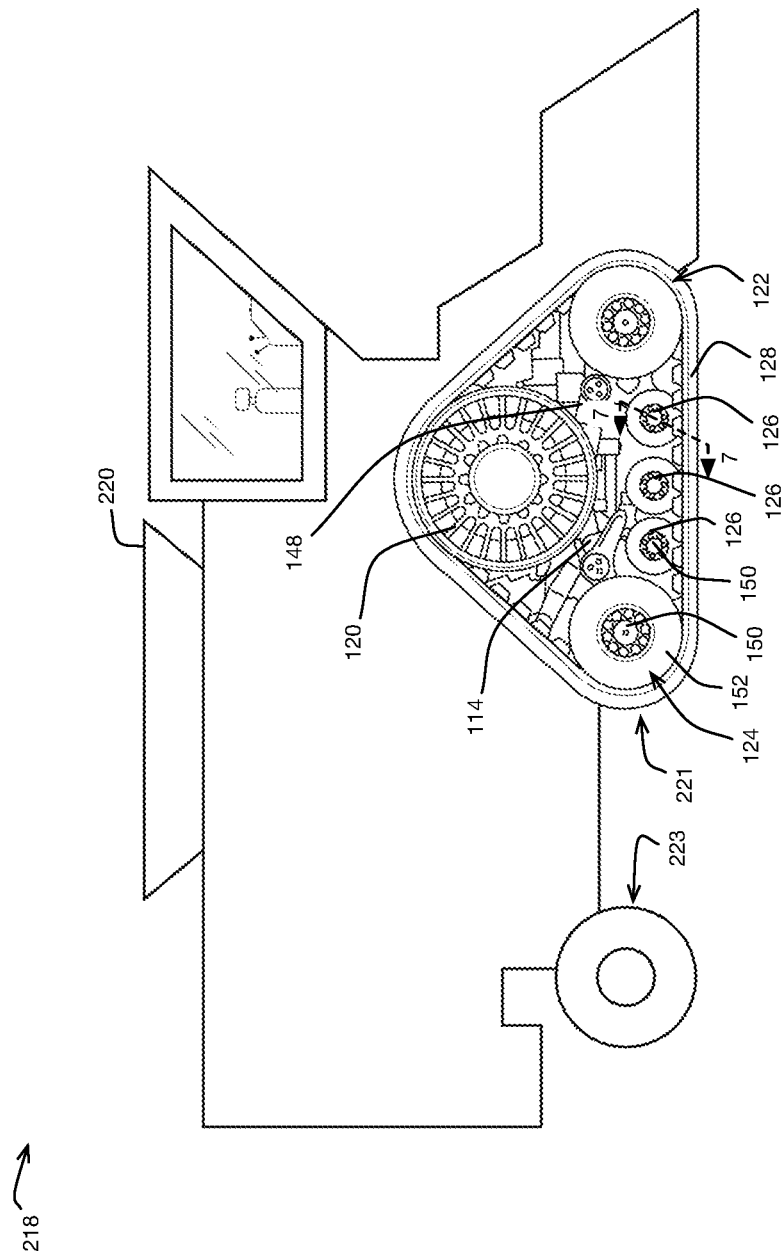
FIG. 7 is a schematic elevation view of a right side of a combine harvester.

In some cases, the track systems 108, 110 and the pneumatic system described above are applied to other vehicles, including trailers and combine harvesters. FIG. 7 shows a particular example where the present technology as described above is applied to a combine harvester 218. The application of the present technology, in this example to the combine harvester 218, is similar to the application of the present technology to the tractor 100, and therefore the same reference numerals have been used. In this non-limiting example, the combine harvester 218 has a pair of front track systems 221, and a pair of rear wheels 223. The front track systems 221 of the combine harvester 218 are similar to the rear track systems 110 of the tractor 100. Therefore, parts of the front track systems 221 of the combine harvester 218 that are similar to corresponding parts of the rear track systems 110 of the tractor 100 have been labeled with the same reference numerals, and will not be described again in detail, unless mentioned otherwise. It is contemplated that any other combination of the track systems and/or wheels could be used.

Figure 8:
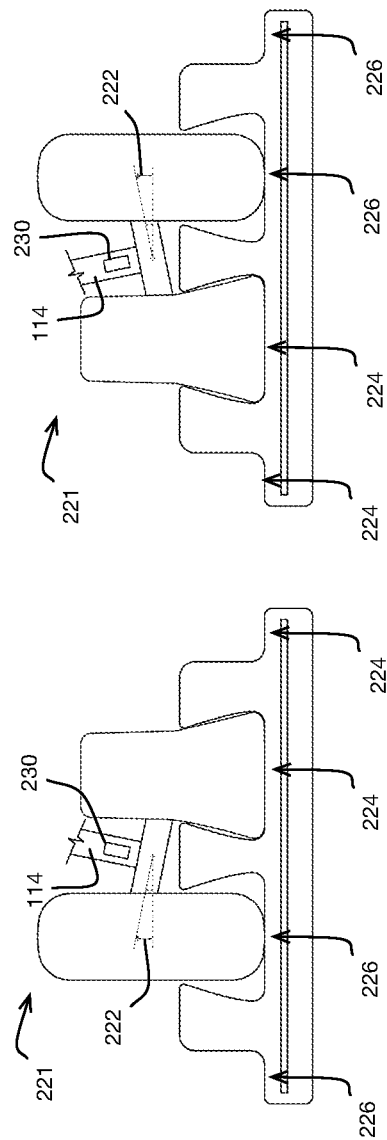
FIG. 8 are schematic elevation section views of the front track systems of the combine harvester of FIG. 7, taken along section line 7-7 of FIG. 7.

One difference in the present application between the combine harvester 218 and the tractor 100 is that the combine harvester 218 includes a hopper 220 for collecting various loads. As schematically shown in FIG. 8 with respect to the mid-roller wheels 126 of the front track systems 221 of the combine harvester 218, when the combine harvester 218 has collected a load, the track system frames 114 of the track systems 221 may tilt inward under the load. The extent of the tilting in FIG. 8 has been exaggerated so as to be more easily seen.

Still referring to FIG. 8, the track system frames 114 of the left and right track systems 221 may be inclined inward, as shown by inward angle 222. In this case, the pressures applied by the tires 152 of the inner support wheels 224 (i.e. on the inner ones of the leading idler wheels 122, the trailing idler wheels 124 and the mid-roller wheels 126) of the track systems 221 on their respective endless track 128 may be higher than the pressures applied by the outer support wheels 226 (i.e. on the outer ones of the leading idler wheels 122, the trailing idler wheels 124 and the mid-roller wheels 126) of the track systems 221 to their respective endless track 128. To maintain clarity of FIG. 8, and in view of the schematic nature thereof, the loaded states of the leading idler wheels 122 and the trailing idler wheels 124 corresponding to the schematically shown loaded states of the mid-roller wheels 126 have not been shown. Although not shown, the leading idler wheels 122 and the trailing idler wheels 124 are understandably loaded and deformed in proportion to the shown loaded states of the mid-roller wheels 126 and the tilted states of the corresponding track system frames 114.

In some embodiments, the system controller 134 of the combine harvester 218 is configured to, in response to detecting such a load distribution condition, increase the fluid pressure in the tires 152 of the inner support wheels 224 of the left and right track systems 221 in the same way as described herein above with respect to the system controller 134 of the tractor 100. This increases the effective radii of the inner support wheels 224 and tilts the track system frames 114 of the track systems 221 outward as shown with reference arrows 228.

In some cases, this functionality is used to correct and/or selectively adjust the camber of each of the track systems 221. In some cases and depending on the corrections and/or adjustments, this may transfer some of the weight of the combine harvester 218 carried by the inner support wheels 224 to the outer support wheels 226. Thus, this may at least in part reduce the differences between the loads applied to the endless tracks 128 by the inner support wheels 224 and the loads applied to the endless tracks 128 by the outer support wheels 226. In some cases, this may help reduce soil compaction when the combine harvester 218 is operated on an agricultural field. In some cases, this may also prevent excessive wear of the inner side of the endless track 128.

In some cases, the system controller 134 may be configured to also decrease the fluid pressure in the tires 152 of the outer support wheels 226. In some cases, this may be done to further reduce the load differences applied thereby and/or to further correct camber. In some cases, the system controller 134 can increase the fluid pressure and effective radii of the tires 152 of the inner support wheels 224 and decrease the fluid pressure in the tires 152 of the outer support wheels 226. The system controller 134 is further configured to redistribute the loading, for each given track system 108, 110, in the reverse direction to the one described herein above, in response to determining that the outer support wheels 226 are more loaded than the inner support wheels 224.

In some embodiments, one or more of the track system frames 114 of the track systems 221 may each include a tilt sensor 230, which could be an inclinometer for example, mounted to the track system frame 114. Each of the tilt sensors 230 may be in electronic communication with the system controller 134 and may generate a tilt signal representative of tilt of the corresponding track system frame(s) 114. In some such embodiments, the system controller 134 is configured to selectively operate corresponding ones of the inflation actuators 182 and/or the deflation actuators 186 depending on the particular tilt of a given track system 221 that is to be corrected, and may thereby correct the tilt to a desired value.

More particularly, for a given track system 221, the system controller 134 may detect a tilt thereof via the tilt signal of the corresponding tilt sensor 230, compare the tilt to a pre-determined desired tilt value for the given track system 221. Based on said comparison, the system controller 134 may selectively increase and/or decrease the effective radii of the inner support wheels 224 and or the outer support wheels 226 of the given track system 221 to correct the tilt of the given track system 221.

The system controller 134 may be configured to correct tilt to be at, or at least nearer to, the desired tilt value. It is contemplated that a desired tilt/camber could be pre-defined specifically for each given track system 221 and that the system controller 134 may be configured to correct the tilt/camber of each of the track systems 221 of the combine harvester 218 independently of the tilt/camber of the other one(s) of the track systems 221 thereof.

Embodiments of the technology taught in the present specification could be made using conventionally known materials and manufacturing methods.

Embodiments of the present technology each have at least one of the above-mentioned object and/or aspects, but do not necessarily have all of them. It should be understood that some aspects of the present technology that have resulted from attempting to attain an above-mentioned object may not satisfy this object and/or may satisfy other objects not specifically recited herein.

Modifications and improvements to the above-described embodiments of the present technology may become apparent to those skilled in the art. The foregoing description is intended to be exemplary rather than limiting.

The invention claimed is:

1. A vehicle, comprising:
a vehicle frame;
a motor supported by the vehicle frame;
a fluid pump supported by the vehicle frame and operable with a fluid;
a plurality of track systems, each track system of the plurality of track systems including:
a track system frame supported by the vehicle frame,
a plurality of leading idler wheels rotationally supported by the track system frame at a front portion thereof,
a plurality of trailing idler wheels rotationally supported by the track system frame at a rear portion thereof,
a plurality of mid-roller wheels rotationally supported by the track system frame between the front portion of the track system frame and the rear portion of the track system frame,
at least one of the plurality of leading idler wheels, the plurality of trailing idler wheels, and the plurality of mid-roller wheels including a tire containing the fluid, and
an endless track looped around the plurality of leading idler wheels, the plurality of trailing idler wheels, and the plurality of mid-roller wheels;
a plurality of fluid lines containing the fluid and fluidly connecting the fluid pump to at least some of the plurality of leading idler wheels, trailing idler wheels and mid-roller wheels of each track system of the plurality of track systems, the fluid pump being operable to pressurize the fluid in the plurality of fluid lines;
a plurality of pneumatic inflation actuators, each pneumatic inflation actuator of the plurality of pneumatic inflation actuators being fluidly in one fluid line of the plurality of fluid lines;
a plurality of pneumatic deflation actuators, each pneumatic deflation actuator of the plurality of pneumatic deflation actuators being fluidly in one fluid line of the plurality of fluid lines; and
a system controller being configured to connect to and control the fluid pump, the plurality of pneumatic inflation actuators, and the plurality of pneumatic deflation actuators, the system controller being operable to selectively adjust fluid pressure in select ones of the at least one the plurality of leading idler wheels, the plurality of trailing idler wheels, and the plurality of mid-roller wheels of any one of the track systems of the vehicle by actuating corresponding ones of the plurality of pneumatic inflation actuators and the plurality of pneumatic deflation actuators
wherein the plurality of track systems includes a pair of front track systems, and a pair of rear track systems;

and the system controller is operable to selectively adjust fluid pressure in select ones of the leading idler wheels, the trailing idler wheels, and the mid-roller wheels of any one of the front track systems while maintaining pressure of each tire of the rear track systems or any one of the rear track systems while maintaining pressure of each tire of the front track systems.

2. The vehicle of claim 1, wherein at least one of the endless track and any one of the plurality of leading idler wheels, the plurality of trailing idler wheels, and the plurality of mid-roller wheels of each track system of the plurality of track systems comprises a pressure mat therein, the pressure mat being in electronic communication with the system controller and outputting a pressure signal to the system controller.

3. The vehicle of claim 2, wherein the system controller is operable to selectively adjust fluid pressure in select ones of the leading idler wheels, the trailing idler wheels, and the mid-roller wheels of any one of the track systems of the vehicle by actuating the corresponding ones of the plurality of pneumatic inflation actuators and the plurality of pneumatic deflation actuators in response to the pressure signal received from the pressure mat of each track system of the plurality of track systems.

4. The vehicle of claim 1, further comprising at least one slip sensor operable to detect slipping of at least one of the plurality of track systems of the vehicle, and wherein the system controller is operable to adjust fluid pressure in the tires of the at least one of the plurality of track systems in response to receiving a signal from the at least one slip sensor indicating slipping of the at least one of the plurality of track systems.

5. The vehicle of claim 1, wherein the system controller is operable to selectively adjust fluid pressure in select ones of the leading idler wheels, the trailing idler wheels, and the mid-roller wheels of any one of the plurality of track systems while maintaining pressure of each tire of the rest of the plurality of track systems.

6. The vehicle of claim 1, wherein the plurality of fluid lines fluidly connect the pressurized fluid storage tank to each track system of the plurality of track systems such that at least one of the leading idler wheels, the trailing idler wheels, and the mid-roller wheels of each track system of the plurality of track systems are pneumatically divided into an inner pneumatic group of wheels and an outer pneumatic group of wheels, fluid pressure in the inner pneumatic group of wheels being adjustable independent of fluid pressure in the outer pneumatic group of wheels.

7. The vehicle of claim 1, wherein the plurality of fluid lines fluidly connect the pressurized fluid storage tank to each track system of the plurality of track systems such that the leading idler wheels, the trailing idler wheels, and the mid-roller wheels of each track system of the plurality of track systems are pneumatically divided into an inner pneumatic group of wheels and an outer pneumatic group of wheels, fluid pressure in the inner pneumatic group of wheels being adjustable independent of fluid pressure in the outer pneumatic group of wheels.

8. The vehicle of claim 2, wherein:
the system controller monitors the pressure signal from the pressure mat of each of the plurality of track systems to determine a pressure applied by each of the plurality of track systems to the endless track of that track system; and
the system controller includes a processor communicatively coupled to a non-transient memory, the non-transient memory storing instructions thereon which when executed by the processor cause the processor to:
determine a pressure difference between the pressure applied by a first track system of the plurality of track systems and the pressure applied by a second track system of the plurality of track, and
actuate select ones of:
a sub-plurality of the plurality of pneumatic inflation actuators corresponding to the first track system and the second track system, and
a sub-plurality of the plurality of pneumatic deflation actuators corresponding to the first track system and the second track system,
to reduce the pressure difference.

9. The vehicle of claim 1, wherein the track system frame of each of the plurality of track systems has a camber, and the system controller is operable to selectively adjust fluid pressure in select ones of at least one of the leading idler wheels, the trailing idler wheels and the mid-roller wheels of any one of the track systems of the vehicle by actuating corresponding ones of the plurality of pneumatic inflation actuators and the plurality of pneumatic deflation actuators to adjust the camber of at least that one of the track systems.

10. The vehicle of claim 1, wherein the vehicle has a center of mass, and the system controller is operable to selectively adjust fluid pressure in select ones of the leading idler wheels, the trailing idler wheels, and the mid-roller wheels of any one of the track systems of the vehicle by actuating corresponding ones of the plurality of pneumatic inflation actuators and the plurality of pneumatic deflation actuators to shift a resultant force acting on the center of mass of the vehicle.

11. The vehicle of claim 1, wherein the fluid pump is an air pump and the fluid is air, and the vehicle further has a pressurized air storage tank supported by the vehicle frame, the air pump being fluidly connected to the pressurized air storage tank and to the atmosphere, the air pump being operable to pressurize the pressurized air storage tank with air from the atmosphere.

12. The vehicle of claim 1, wherein the fluid pump is a liquid pump and the fluid is a liquid.

13. The vehicle of claim 1, wherein at least one track system of the plurality of track systems further includes a drive wheel rotationally supported by the track system frame of that one of the track systems, the drive wheel being operatively connected to the motor to be driven by the motor, and the endless track loops around the drive wheel, the plurality of leading idler wheels, the plurality of trailing idler wheels, and the plurality of mid-roller wheels.

14. A track system for a vehicle, comprising:
a track system frame;
a plurality of leading idler wheels rotationally supported by the track system frame at a front portion thereof,
a plurality of trailing idler wheels rotationally supported by the track system frame at a rear portion thereof,
a plurality of mid-roller wheels rotationally supported by the track system frame between the front portion of the track system frame and the rear portion of the track system frame,
at least one of the plurality of leading idler wheels, the plurality of trailing idler wheels, and the plurality of mid-roller wheels including a tire containing a fluid having a fluid pressure, and
an endless track looped around the plurality of leading idler wheels, the plurality of trailing idler wheels, and the plurality of mid-roller wheels;

wherein the track system is in communication with a system controller, the system controller being operable to selectively adjust the fluid pressure in the tire of the at least one of the plurality of leading idler wheels, the plurality of trailing idler wheels, and the plurality of mid-roller wheels;

wherein the track system frame has a camber, and the system controller is operable to selectively adjust the fluid pressure in select ones of the tires of the at least one of the plurality of leading idler wheels, the plurality of trailing idler wheels, and the plurality of mid-roller wheels of the track system to adjust the camber of the track system.

15. The track system of claim 14, wherein at least one of the endless track and any one of the plurality of leading idler wheels, the plurality of trailing idler wheels, and the plurality of mid-roller wheels of the track system comprises a pressure mat therein, the pressure mat being in electronic communication with the system controller and outputting a pressure signal to the system controller.

16. The track system of claim 14, wherein the system controller is configured to connect to and control a fluid pump, a plurality of pneumatic inflation actuators, and a plurality of pneumatic deflation actuators.

17. The track system of claim 16, wherein the system controller is operable to selectively adjust fluid pressure by actuating corresponding ones of the plurality of pneumatic inflation actuators and the plurality of pneumatic deflation actuators to adjust the camber of the track system.

18. The track system of claim 16, wherein at least one of the plurality of leading idler wheels, the plurality of trailing idler wheels, and the plurality of mid-roller wheels of the track system are pneumatically divided into an inner pneumatic group of wheels and an outer pneumatic group of wheels, fluid pressure in the inner pneumatic group of wheels being adjustable independent of fluid pressure in the outer pneumatic group of wheels.

\* \* \* \* \*